United States Patent
McLure et al.

(10) Patent No.: US 7,313,754 B2
(45) Date of Patent: Dec. 25, 2007

(54) METHOD AND EXPERT SYSTEM FOR DEDUCING DOCUMENT STRUCTURE IN DOCUMENT CONVERSION

(75) Inventors: Petra McLure, Amherst, NH (US); Carl Scholz, Sudbury, MA (US); Ronald Whitney, Providence, RI (US)

(73) Assignee: Texterity, Inc., Southborough, MA (US)

( * ) Notice: Subject to any disclaimer, the term of this patent is extended or adjusted under 35 U.S.C. 154(b) by 0 days.

(21) Appl. No.: 10/388,685

(22) Filed: Mar. 14, 2003

(65) Prior Publication Data

US 2004/0181746 A1  Sep. 16, 2004

(51) Int. Cl.
G06F 15/00 (2006.01)

(52) U.S. Cl. ............... 715/500; 715/512; 715/522

(58) Field of Classification Search ......... 715/500, 715/522–523, 530, 513; 345/764, 809
See application file for complete search history.

(56) References Cited

U.S. PATENT DOCUMENTS

| | | | | |
|---|---|---|---|---|
| 5,146,552 | A * | 9/1992 | Cassorla et al. ......... 715/512 |
| 5,634,564 | A * | 6/1997 | Spamer et al. .......... 211/59.3 |
| 5,742,815 | A | 4/1998 | Stern ..................... 395/414 |
| 5,896,462 | A | 4/1999 | Stern ..................... 382/306 |
| 6,154,213 | A * | 11/2000 | Rennison et al. ....... 345/854 |
| 6,161,107 | A | 12/2000 | Stern .................... 707/104 |
| 6,336,124 | B1 * | 1/2002 | Alam et al. ............ 715/523 |
| 6,360,236 | B1 * | 3/2002 | Khan et al. ............ 715/526 |
| 6,725,426 | B1 * | 4/2004 | Pavlov ................. 715/523 |
| 2002/0015059 | A1 * | 2/2002 | Clarke .................. 345/744 |
| 2002/0078100 | A1 * | 6/2002 | Tewari .................. 707/523 |
| 2002/0111963 | A1 * | 8/2002 | Gebert et al. ........... 707/513 |
| 2002/0154751 | A1 * | 10/2002 | Thompson et al. .... 379/114.01 |
| 2002/0165647 | A1 * | 11/2002 | Glenn et al. ............ 701/3 |
| 2002/0174145 | A1 * | 11/2002 | Duga et al. ............ 707/513 |
| 2002/0188532 | A1 * | 12/2002 | Rothstein .............. 705/29 |
| 2003/0043186 | A1 * | 3/2003 | Libman ................. 345/748 |
| 2003/0121000 | A1 * | 6/2003 | Cooper et al. ......... 715/513 |
| 2003/0130845 | A1 * | 7/2003 | Poplawski ............. 704/255 |
| 2003/0142128 | A1 * | 7/2003 | Reulein et al. ........ 345/742 |
| 2003/0144982 | A1 * | 7/2003 | Reulein et al. ........ 707/1 |
| 2003/0167455 | A1 * | 9/2003 | Iborra et al. .......... 717/105 |
| 2004/0107118 | A1 * | 6/2004 | Hamsberger et al. ..... 705/2 |
| 2004/0205616 | A1 * | 10/2004 | Rosenberg et al. ..... 715/523 |

OTHER PUBLICATIONS

U.S. Appl. No. 60/429,933, filed Nov. 2002.*
"How to Create Accessible Adobe PDF Files", copyright 2001, pp. 1-28.*
"Adobe Acrobat 5.0 Classroom in a Book" (herein after Adobe), copyright 2001, pp. 1-155.*

* cited by examiner

*Primary Examiner*—Thu Huynh
(74) *Attorney, Agent, or Firm*—Iandiorio & Teska

(57) ABSTRACT

An expert system for more efficiently and accurately deducing document structure from document formatting, the expert system including a conversion engine for converting an unstructured file to a structured file, and a verification engine, responsive to the output of the conversion engine, for generating and displaying a representation of the structured file annotated with a visual depictions of the classified components thereof so that the annotations can be modified and/or classifications can be added and/or classifications can be suggested, and/or rules for classification can be suggested and the structured file reprocessed by the conversion engine.

56 Claims, 21 Drawing Sheets

60

| BROKERAGE FIRM | ● Log In  ● Contact Us  ● Search  ● Investor Library | | About |
|---|---|---|---|
| | | | Investor Library |

SEARCH FOR: Text ▼  SEARCH IN: All Documents ▼  KEYWORDS: [    ] (FIND IT)  [    ]

Browse Industries

● Computers, Data Systems-Data Processing, Software

● Utilities-Electric Services

● Financial Services

● Industrial Machinery And Equipment-Heavy Machinery

● Retail Trade-Department Store Chains

● Computers, Data Systems-Computer Systems

● Electronics-Test, Control Instruments And Systems

● Electrical Equipment

Welcome to the Brokerage Firm Investor Services Library!

Here is your annual report library, a part of the Brokerage Firm Investor Services Platform. You can include reports from any company, whether or not you hold its stock. You can also set alerts to be notified of new documents from your companies.

---

Featured Reports

62

Automatic Data Processing, Inc. 2001 Annual Report (VIEW)

Ticker: NYSE: ADP
Published: 08/13/2001 (40 pages)

ADP is one of the largest providers of computerized transaction processing, data communication, and information services

63

TECO Energy, Inc. 2001 Annual Report (VIEW)

Ticker: NYSE: TE
Published: 03/01/2002 (62 pages)

TECO Energy, Inc. (NYSE: TE) is an energy-related holding company with a growing family of unregulated businesses. In addition to the regulated operations of Tampa Electric and Peoples Gas System, TECO Energy is engaged in independent power generation

65

Exelon Corporation 2001 Annual Report (VIEW)

Ticker: NYSE: EXC
Published: 01/11/2002 (98 pages)

A single kilowatt hour will allow you to make six batches of popcorn, blow dry your hair for an hour or vacuum your carpet for an hour and a half. Multiply this

*FIG. 10*

METHOD AND EXPERT SYSTEM FOR DEDUCING DOCUMENT STRUCTURE IN DOCUMENT CONVERSION

FIELD OF THE INVENTION

This invention relates to the field of converting unstructured document files to structured formats.

BACKGROUND OF THE INVENTION

Unstructured computer document files (e.g., documents formatted as word processing files) are converted to a structured format (e.g., extensible mark-up language (XML) formats) in order to provide tracking, meta-data management, a table of contents, word and phrase searching and retrieval, scaling, and the like so that, for example, books can be converted to e-Book file formats and so a company's reports and documents can be more easily managed and even served up over the world wide web, searched, organized, and viewed one page at a time. Thus, there has long been a need to convert unstructured document files to a structured format.

In the prior art, individual documents were first converted to the XML format manually at a great cost because the manual conversion process was lengthy and required a technician skilled in XML as well as knowledgeable in the subject matter of the document. There was also an attempt to have people draft documents according to the XML format in the first instance—an attempt which understandably failed.

Next, those skilled in the art attempted to design computer based conversion engines which were to automatically convert "Word" files to, for example, the XML format. In reality, however, the conversion engines produced inaccurate results and low quality products and, as a result, manual labor was still required to correct the output of the conversion engine for quality assurance purposes and to ensure that the XML representation of the original file was correct. A technician would directly compare the original "Word" document, for example, with the XML representation of the document output by the conversion engine resulting in added costs and long conversion cycles.

Accordingly, until now, there was no adequate system or method for converting unstructured documents to a structured format.

SUMMARY OF THE INVENTION

It is therefore an object of this invention to provide an expert system and method for more efficiently deducing document structure from document formatting.

It is a further object of this invention to provide such an expert system and method which is highly efficient.

It is a further object of this invention to provide such an expert system and method which results in a better quality output.

It is a further object of this invention to provide such an expert system and method which is faster than prior art systems and methods and which is less labor intensive.

The invention results from the realization that a more efficient and accurate method and system for deducing document structure from document formatting includes the generation and display of an operator friendly graphical representation of the results of the conversion process and allowing an unskilled operator to modify that graphical representation so that the conversion process is more accurate before the final conversion is completed—a process which then takes into account the operator's modifications even to the point of enhancing the operation of the rules set of the conversion engine.

This invention features an expert system for more efficiently and accurately deducing document structure from document formatting, the expert system including a conversion engine for converting an unstructured file to a structured file, and a verification engine, responsive to the output of the conversion engine, for generating and displaying a representation of the structured file annotated with visual depictions of the classified components thereof so that the annotations can be modified and/or classifications can be added and/or classifications can be suggested, and/or rules for classification can be suggested and the structured file reprocessed by the conversion engine.

In a preferred embodiment, the representation may be a graphics based page description language file annotated with visual depictions of the classified components of a document. After the annotated graphics based page description language file is modified, it may be input to the conversion engine. The conversion engine may be programmed to convert a graphics based page description language file to a flat file representation of all metrics known about each character and image of the graphics based page description language file, group all said metrics in an intermediate mark-up language file, and create an output mark-up language file including components of the document classified into their respective component parts and relationships. The graphics based page description language file may be a PDF file, the flat file may be a comma separated value file, the intermediate mark-up language file may be a GPML file, and the output file may be an XML file. The conversion engine may include a rules engine including a set of rules. The expert system may further include a feedback channel wherein an annotated graphics based page description language file modified using the verification engine may be compared with the original annotated graphics base page description language file and, based on the comparison, the conversion engine may be programmed to change the operation of the rules of the rules engine. The conversion engine may be programmed to output outputs selected from the following group: a word list including the coordinates of each word on a page, a table of contents, scaleable vector graphic images, a cascading style sheet, and an ADOBE® e-Book.

In one preferred embodiment, the structured file annotated with visual depictions may be modified to classify the annotations as a plurality of header level components of the structured file. The plurality of header levels may include H1, H2, H3, H4, H5, and H6. The H1 header level may classify a "Part" of the structured file. The H2 header level may classify a "Chapter" of the structured file. The H3 header level may classify a "Sub-Chapter" of the structured file. The H4 header level may classify a "Sub-sub Chapter" of the structured file. The H5 header level may classify an operator defined element of the structured file. The H6 header level may classify an operator defined element of the structured file.

The H1 header level may be classified by selecting an H1 icon and drawing a box about the annotated visual depictions which represent the "Part" of the structured file. The H1 icon and the box may be colored red and the H1 icon may include the text "H1". The H2 header level may be classified by selecting an H2 icon and drawing a box about the annotated visual depictions which represent the "Chapter" of the structured file. The H2 icon and the box may be colored blue and the H2 icon includes the text "H2". The H3 header level may be classified by selecting an H3 icon and drawing a box about the annotated visual depictions which represent the "Subchapter" of the structured file. The H3 icon and the box may be colored green and the H3 icon includes the text "H3". The H4 header level may be classified by selecting an H4 icon and drawing a box about the annotated visual depictions which represent the Sub-subchapter of the structured file. The H4 icon and the box may be colored fuchsia and the H4 icon includes the text "H4". The H5 header level may be classified by selecting an H5 icon and drawing a box about the annotated visual depictions which represent an operator defined part of the structured file. The H5 icon and the box may be colored aqua and the H5 icon may include the text "H5". The H6 header level may be classified by selecting an H6 icon and drawing a box about the annotated visual depictions which represent an operator defined element of the structured file. The H6 icon and the box may be colored black and the H6 icon may include the text "H6".

The structured file annotated with visual depiction may be modified to add or suggest classification of running header components at the top of every page of the structured file. The running header may be classified by selecting a header/footer icon and drawing a box about the annotated visual depictions which represent the running header of the structured file. The header/footer icon and the box may be colored orange and the icon may include the depiction of page with a header and footer.

The structured file annotated with visual depictions may be modified to add or suggest classification of running footer components at the bottom of every page of the structured file. The running footer may be classified by selecting a header/footer icon and drawing a box about annotated visual depictions which represent the running header of the structured file.

In one embodiment, the system may include a plurality of icons for activating the conversion engine and verification engine. A "New" icon may initialize and create a hint file so that an operator can define hints. An "Execute" icon may execute a hinting process. A "New TC" icon may create a hint file containing hintable objects file. A "Reset" icon may clear all local and intermediate files of the system. An "Undo Hints" icon may undo the results of the last hint cycle. A "Change Elements" icon may change existing elements of the structured annotated graphics based page description file from one class of elements to another class of elements. A "Change Encoding" icon may activate a dialog box wherein an operator can correct unicode mapping of the structured annotated graphics based page description file. An "Edit Rules File" icon may activate a dialog box for an operator to configure a match for a particular hint element. The dialog box may be used to select particular attributes of the structured annotated graphics based page description file. The dialog box may select size, slant, weight, underline, strikethrough, adornment, color, baseline, font name, small caps, case, PDF-x-overlap, PDF-y-overlap, left-align, right-align, top-align, and bottom-align. A "Body-Start" icon may mark the beginning of a text body of the annotated graphics based page description file. A "Body-End" icon may mark the end of a body of the structured annotated graphics based page description file.

This invention further features a method for more efficiently and accurately deducing document structure from document formatting, the method including a) converting an unstructured file to a structured file wherein the components of the file are classified, b) generating and displaying a representation of the structured file annotated with visual depictions of the classified components thereof, c) modifying the annotated visual depictions and/or adding classifications and/or suggesting classifications and/or suggesting rules for the classifications associated with step a), and d) repeating steps a), b), and c) until no further modifications are made.

In a preferred embodiment the method may further include the step of creating an output file based on the structured file and the modifications and/or additions and/or suggestions made in steps c) and d). The displayed representation may be a graphics based page description language file annotated with visual depictions of the classified components of the document and in which step c) may include modifying the annotated graphics based page description language file. Step a) may include the steps of a1) converting a graphics based page description language file to a flat file representation of all metrics known about each character and image of the graphics based page description language file, a2) grouping all said metrics in an intermediate mark-up language file, and a3) creating an output mark-up language file including components of the document classified in to their respective component parts and relationships. Step d) may include repeating steps a2) and a3). Step d) may further include repeating step a1), a2) and a3). The graphics based description language file may be a PDF file, the flat file may be a comma separated value file, the intermediate mark-up language file may be a GPML file, and the output file may be an XML file. Step a) may further include the operation of a rules engine including a set of rules. The method may further include the step of comparing the annotations displayed with the modified annotations, and based on the comparison, amending the operation of the rules of the rules engine.

The method may further include the step of outputting, based on the structured file, outputs selected from the following group: a word list including the coordinates of each word on a page, a table of contents, scaleable vector graphic images, a cascading style sheet, and an ADOBE® e-Book in PDF format.

BRIEF DESCRIPTION OF THE DRAWINGS

Other objects, features and advantages will occur to those skilled in the art from the following description of a preferred embodiment and the accompanying drawings, in which:

FIG. 10 is a view of a computer screen displaying a number of documents converted into the XML format in accordance with the system and method of this invention;

DISCLOSURE OF THE PREFERRED EMBODIMENT

Figure 1:
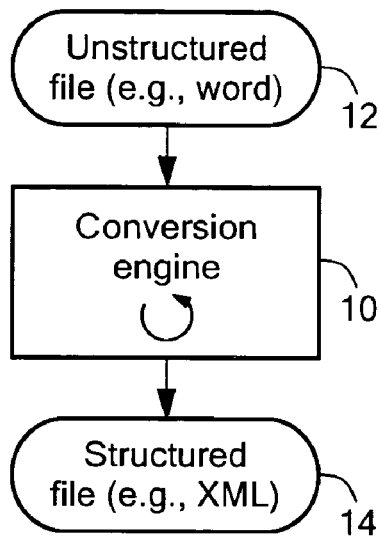
FIG. 1 is a block diagram showing a prior art conversion engine.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
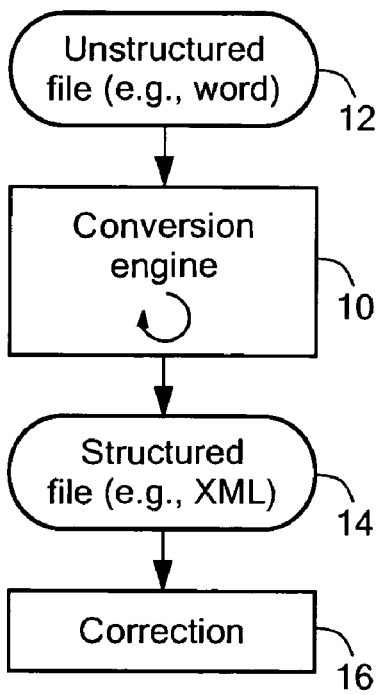
FIG. 2 is a block diagram also showing a prior art conversion engine and the correction effort required due to the inaccurate results produced by the conversion engine.

As discussed in the Background section above, prior art methods of document conversion typically utilize computer based conversion engine 10, FIG. 1 to automatically convert unstructured file 12 (e.g., a word processing document, such as a MICROSOFT WORD® document or similar type word processing document, or any other type of unstructured document) to structured file 14 (e.g., a document in XML format). Because conversion engine 10 produces an inaccurate representation of unstructured file 12 as structured file 14, a low quality product is generated. The result is that operator correction is required, as indicated at 14, FIG. 2 to provide an accurate representation of structured file 14 in XML format. The correction process requires a skilled technician versed in XML to compare original unstructured document 12 to structured document 14 and make the appropriate corrections in the XML document—a process which increases the cost of the conversion process and results in longer conversion cycles.

Figure 3:
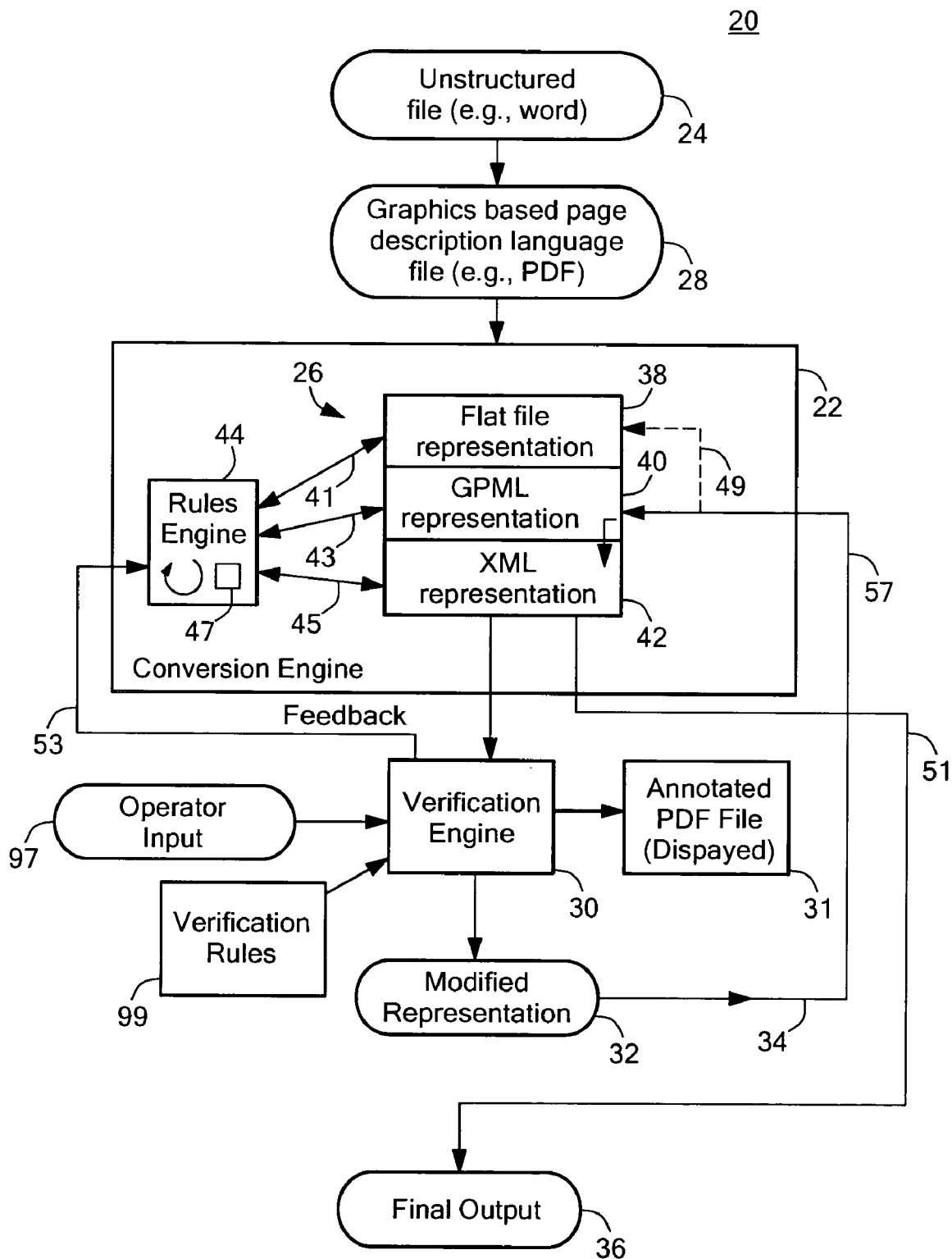
FIG. 3 is a schematic block diagram showing the primary components associated with the expert conversion system of this invention as well as the primary steps associated with the method of this invention.

In contrast, expert conversion method and system 20, FIG. 3 of this invention more efficiently and accurately deduces document structure from document formatting. System 20 includes conversion engine 22 for converting unstructured file 24 (e.g., a "Word" document or similar unstructured file) to structured file 26 (e.g., XML representation 42) to classify the components of structured file 26. Unstructured file 24 is converted to graphics based page description file 28 (e.g., a PDF file) by a document conversion utility, such as ADOBE®, or any other suitable utility. The PDF format describes graphics based page description file 28 in terms of how it appears on the printed page or computer screen. Relevant data in graphics based page description file 28 may include fonts used, which may include drawing instructions/data for each character, size and style information; text layout information indicating where the characters are placed on the page/screen; geometric drawings which may include lines, rectangles, and other shapes; information on color backgrounds, text, and/or geometric drawings, and embedded images in other formats such as jpg, png, gif, and the like.

Expert conversion method and system 20 also includes verification engine 30 responsive to the output of conversion engine 22 for generating and displaying a representation of structured file 26 annotated with visual depictions of the classified components so that the annotations can be modified and/or classifications can be added and/or classifications can be suggested, and/or rules for the classifications can be suggested and structured file 26 reprocessed by conversion engine 22.

In one embodiment, the representation of structured file 26 is annotated graphics based page description file (PDF) 31 annotated with visual depictions of the classified components of a document. After annotated PDF file 31 has been modified (as will be discussed in detail below), verification engine 30 provides modified representation 32 which is reprocessed by conversion engine 22, as indicated at 34.

The result is that expert conversion method and system 20 efficiently and accurately deduces the document structure of unstructured file 24 because of the unique ability of verification engine 30 to generate and display an operator friendly graphical representation of the results of the conversion process as annotated PDF file 31. This allows an unskilled operator to modify annotated PDF file 31 with visual cues and correct any errors created by the conversion process. Moreover, classifications of structural elements of annotated PDF file can be added or suggested by the operator, which are then incorporated into the conversion process by conversion engine 22. The unique process of an operator modifying the structural understanding of structural file 26 displayed as annotated PDF file 31 results in a highly efficient conversion process which is significantly more accurate and less labor intensive than prior art conversion systems.

In one embodiment, conversion engine 22 is programmed to convert graphics based page description file 28 to flat file representation 38 which includes all metrics known about each character and image of graphics based page description file 28.

In one design of this invention conversion engine 22 is programmed in a language such as Java or C to classify the components of graphics based page description file 28 by isolating and organizing all relevant data about the page structure. Conversion engine 22 converts graphics based page description file 28 to flat file representation 38, typically a comma separated value file, which includes all metrics known about each character and image of graphics based page description file 28. Graphics based page description file 28 is parsed page by page by conversion engine 22 to create a catalog of every character, image, and shape present on the pages of graphics based page description file 28. Each item is listed in flat file representation 38 with all the relevant data accompanying it, which may include fonts, color, style, position, and the like. Each page is typically catalogued separately.

Conversion engine 22 also groups all metrics from flat file representation 38 to an intermediate mark-up language file, such as GPML representation 40. The data from flat file representation 38 is analyzed by conversion engine 22 and based on factors such as position, inter-character spacing, font characteristics, related geometric shapes and color, and the like, the characters of flat file representation 38 are grouped into words and groups of words in GPML representation 40. The groups of words represent logical units, such as paragraphs or captions or headings.

GPML representation 40 (e.g., an intermediate mark-up file) is further analyzed by conversion engine 22 to create an output mark-up language file, such as XML representation 42 which includes components of the original unstructured file 24 (e.g., a "Word" document), classified into their respective component parts and relationships. Conversion engine 22 is programmed to analyze GPML representation 40 to locate trends which may include, for example, frequency of typeface usage, repetitions of text at certain page positions, relative font sizes, key indicators such as numbers, indentation patterns, and the like. All the factors analyzed by conversion engine 22 are output to XML representation 42 (e.g., an output mark-up language file). XML representation 42 includes an approximation of the structure and hierarchy of the original unstructured document 24 and indicates the relative heading levels, paragraphs, lists, extracts, running heads and running feet, and reading order of text groups.

Expert conversion system 20 further includes feedback channel 53 wherein annotated PDF file 31 which has been modified by an operator using verification engine 30 is compared with the original annotated graphics based page description file (e.g., graphics based page description file 28) and, based on the comparison, conversion engine 22 is programmed to change the operation of set of rules 47 of rule engine 44. Set of rules 47 used by rules engine 44 may be used to deduce the implied structure and hierarchy of the graphics based page description file 28. Flat file representation 38, intermediate mark-up language file (e.g., GPML representation 40), and output mark-up language file (e.g., XML representation 42) may be input into rules engine 44, as indicated at 41, 43, and 45, respectively. Rules engine 44 utilizes set of rules 47 to decide such factors as which thresholds are used in the spacing considerations, margin and gutter sizes, deviations and font sizing, color assumptions and the like. Although as shown in FIG. 3 rules engine 44 is imbedded in conversion engine 22, this is not a necessary limitation of this invention, as rules engine 44 may also be an external source to conversion engine 22.

Verification engine 30 provides an interactive graphical interface for a user to graphically view the annotated PDF file 31 so that annotation can be modified and/or classification can be added or suggested and rules for the classification can be suggested while overlaying the current XML representation (e.g., XML representation 42). XML and plain text editors may be used to modify the structured representation and associated rules. This example implementation uses a plug-in written in C using the ADOBE® SDK.

Figure 4:
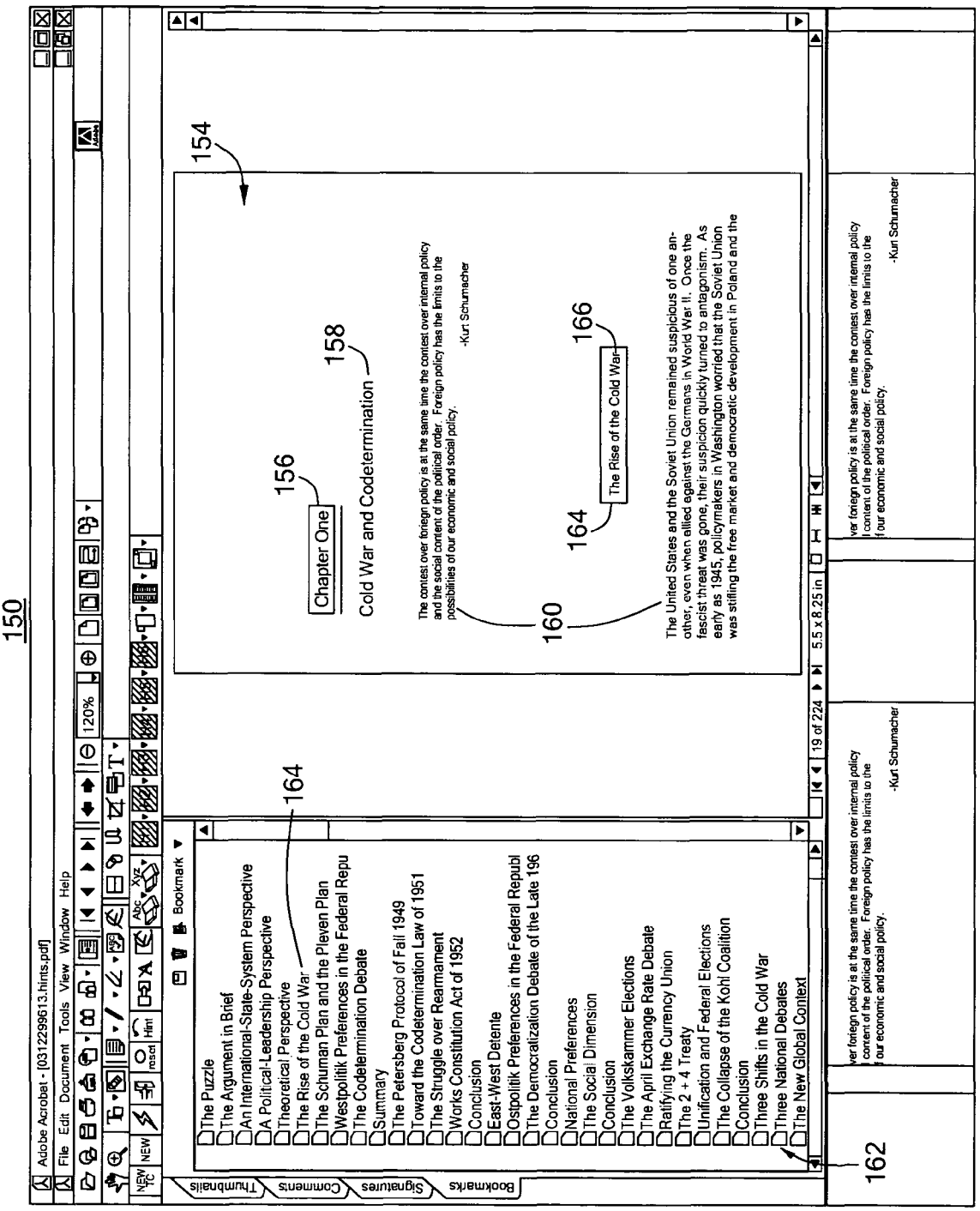
FIG. 4 is a view of an exemplary screen display showing an example of the graphical interface of the verification engine displaying an annotated PDF file in accordance with this invention.

For example, FIG. 4 is an exemplary screen display of graphical interactive interface 150 provided by verification engine 30 of expert system 20. Interface 150 displays a representation of structured file 26 as annotated PDF file 31, FIG. 3 after graphics based page description file 28 (e.g., the original PDF file converted from unstructured file 24) has been processed through the conversion engine 22. Interface 150, FIG. 4 graphically shows the visual depictions of the classified components of graphics based page description file 28 that have been deduced automatically by conversion engine 22, such as, for example, bookmarks 152, visual depiction of a page 154 which may include, in one example, chapter heading 156, chapter title 158, and text 160. Bookmark 164, in this example for "The Rise of the Cold War" may be displayed in greater detail by annotated visual depiction 166 which may be surrounded by a colored dashed box, such as a blue dashed box.

Verification engine 30, FIG. 3 allows an operator to modify the structural understanding of annotated PDF file 31, as indicated by operator input 97. Verification engine 30 generates modified representation 32 in response to the operator's modification to annotated PDF file 31. This may be performed by at least two methods: 1) by pointing out examples of certain structures in annotated PDF file 31 with visual cues, which conversion engine 22 then reprocess to find all occurrences of that structure, as show at 34, or 2) by explicitly indicating which parts of the annotated PDF file 31 should be marked as part of which structural element, also via visual cues, which are then reprocessed by conversion engine 22.

Figure 8:
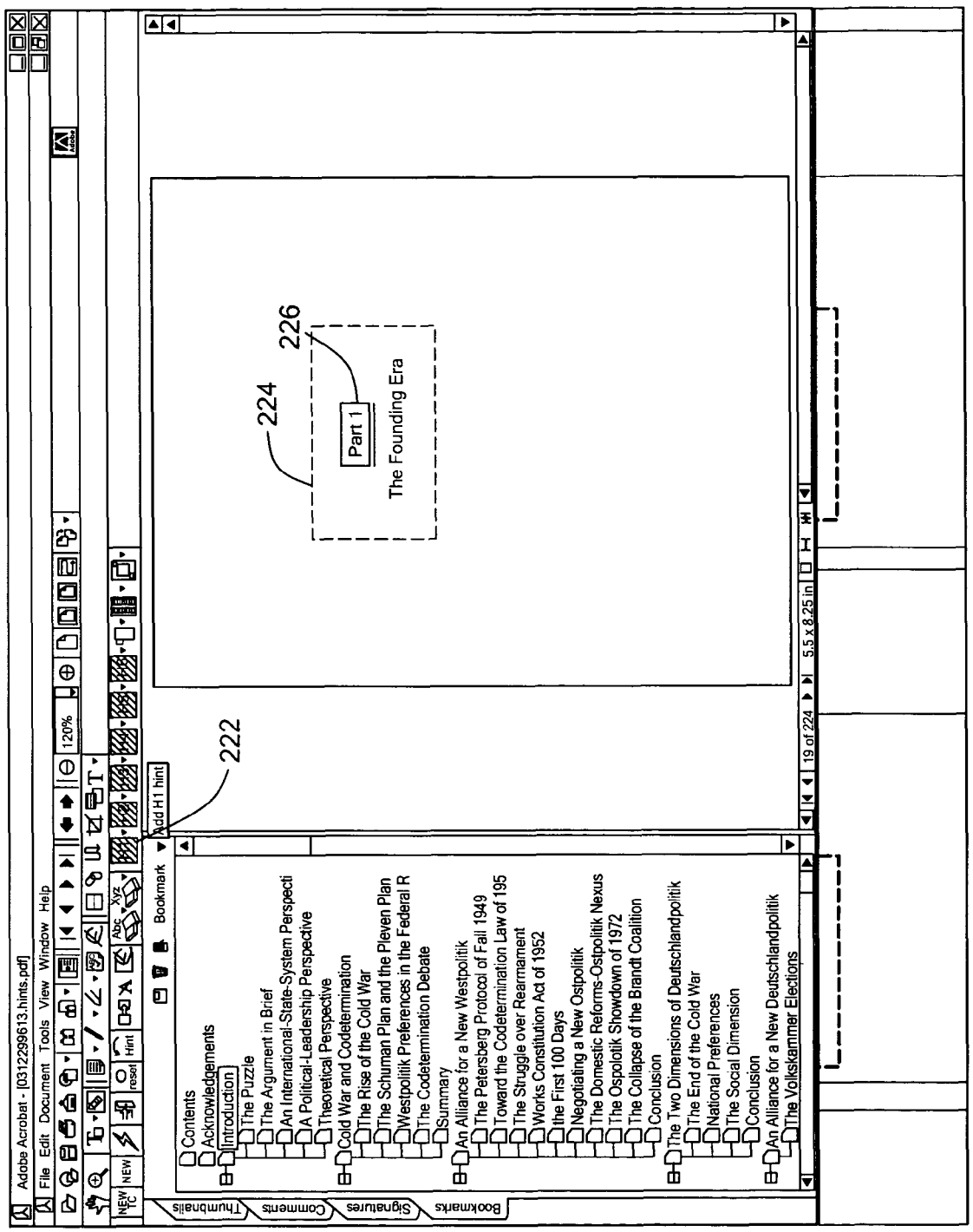
FIG. 8 is a view of an exemplary screen display showing an operator classifying an H1 header level by selecting the H1 hint icon and drawing a dashed box about the structural element of the annotated PDF file which represent the "Part" of the structural file.

An example of method 1) is shown in FIG. 8. In this example, an example of an H1 header level is chosen by selecting H1 icon 222 and drawing dashed box 224 about the visual depiction of structured file 26 which represents the H1 header level, in this example "Part I" of structured file 26. In one design, H1 icon 222 and dashed box 224 are colored red. After the structured elements which represent the H1 header level have been annotated by the operator, verification engine 30 creates modified representation 32, FIG. 3 which is then processed by conversion engine 22, as indicated at 34, which locates all other instances of structured elements that match the annotated example using the characteristics defined in the verification rules 99. Conversion engine 22 updates flat file representation 38 (indicated by dashed arrow 49), GPML representation 40 (as indicated at 57), to yield XML representation 42. Verification engine 30 then displays the results as annotated PDF file 31.

Figure 13:
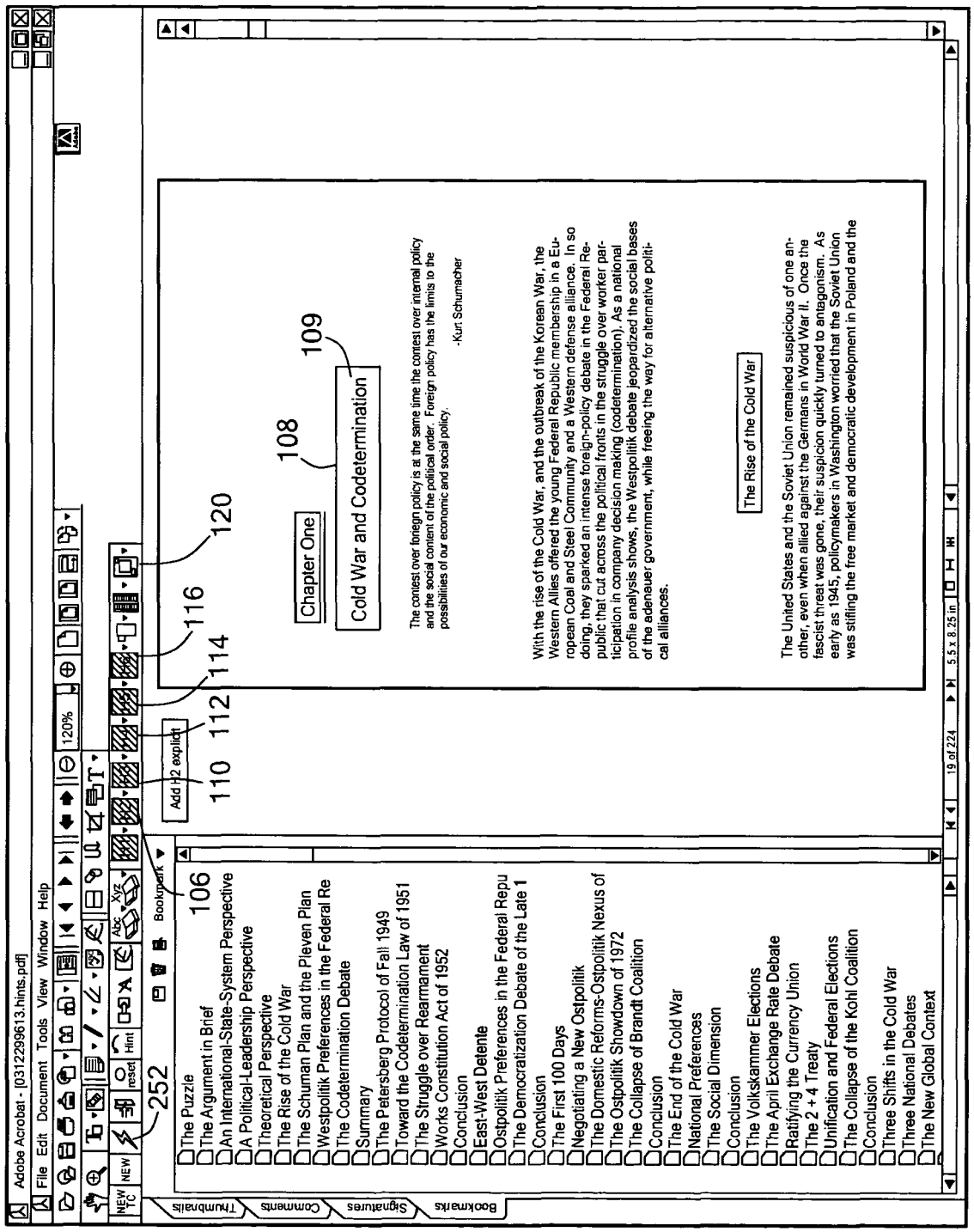
FIG. 13 is a view of an exemplary screen display showing an operator selecting an H2 hint icon and drawing a box around the chapter title to define an H2 header level of the annotated PDF file in accordance with this invention.

An example of method 2) is shown in FIG. 13. In this example, the H2 header level is chosen by selecting H2 icon 106 and drawing solid box 108 about the visual depiction of structured filed 26 which represents the H2 header level, in this example "Cold War and Codetermination" of structured file 26. In one design, H2 icon 106 and solid box 108 are colored blue. After the structured elements which represent the H2 header level have been annotated by the operator, verification engine 30, FIG. 3 creates modified representation 32 which is then processed by conversion engine 22, as indicated at 34, which locates all instances of the explicitly marked structure in flat file representation 38 (indicated by dashed arrow 49), GPML representation 40 (as indicated at 57), to yield XML representation 42. Verification engine 30 then displays the results as annotated PDF file 31.

Figure 5:
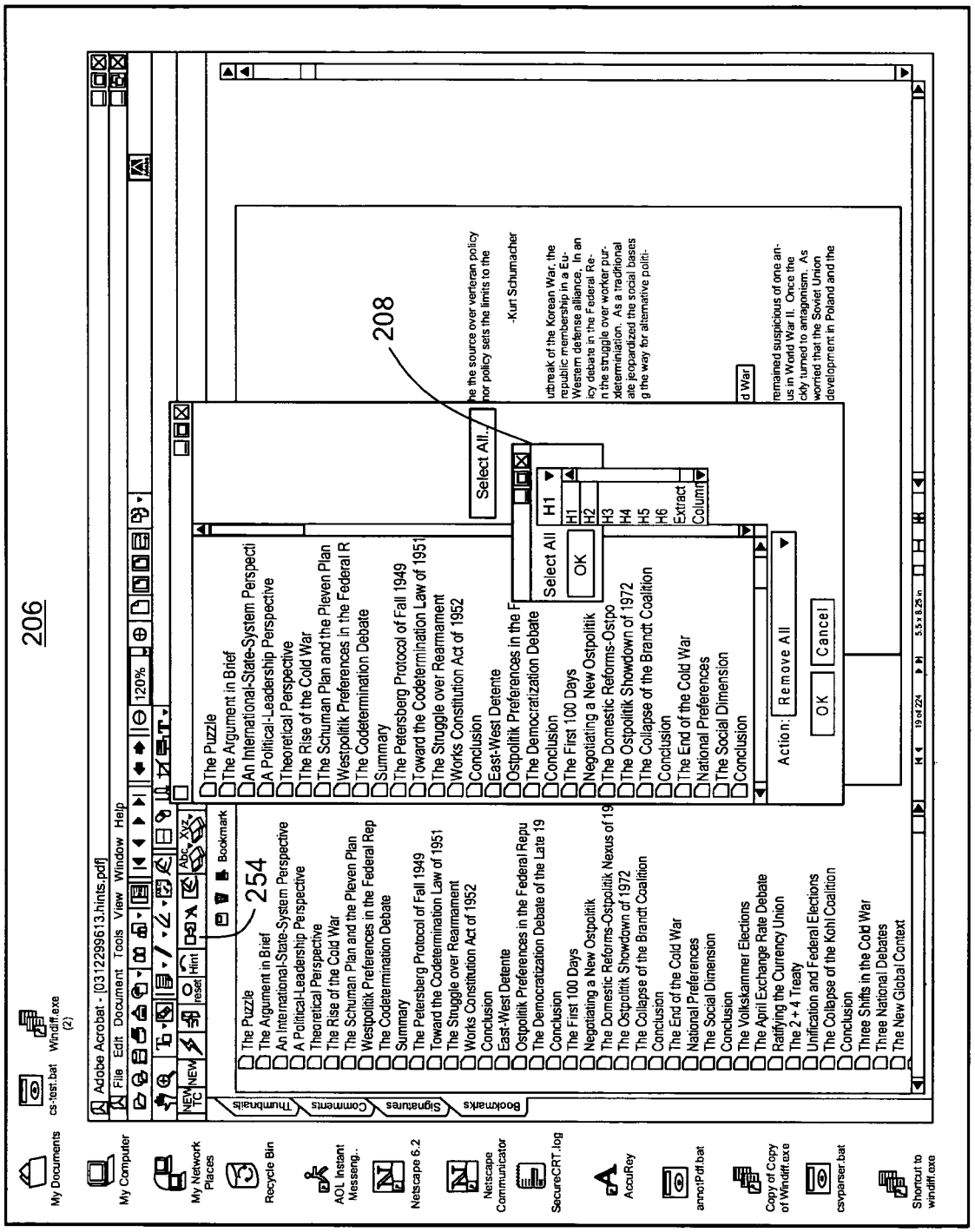
FIG. 5 is a view of an exemplary screen display showing an operator modifying a structural element of the annotated PDF file shown in FIG. 4 by selecting the H2 header level of the annotated PDF file in accordance with this invention.
Figure 6:
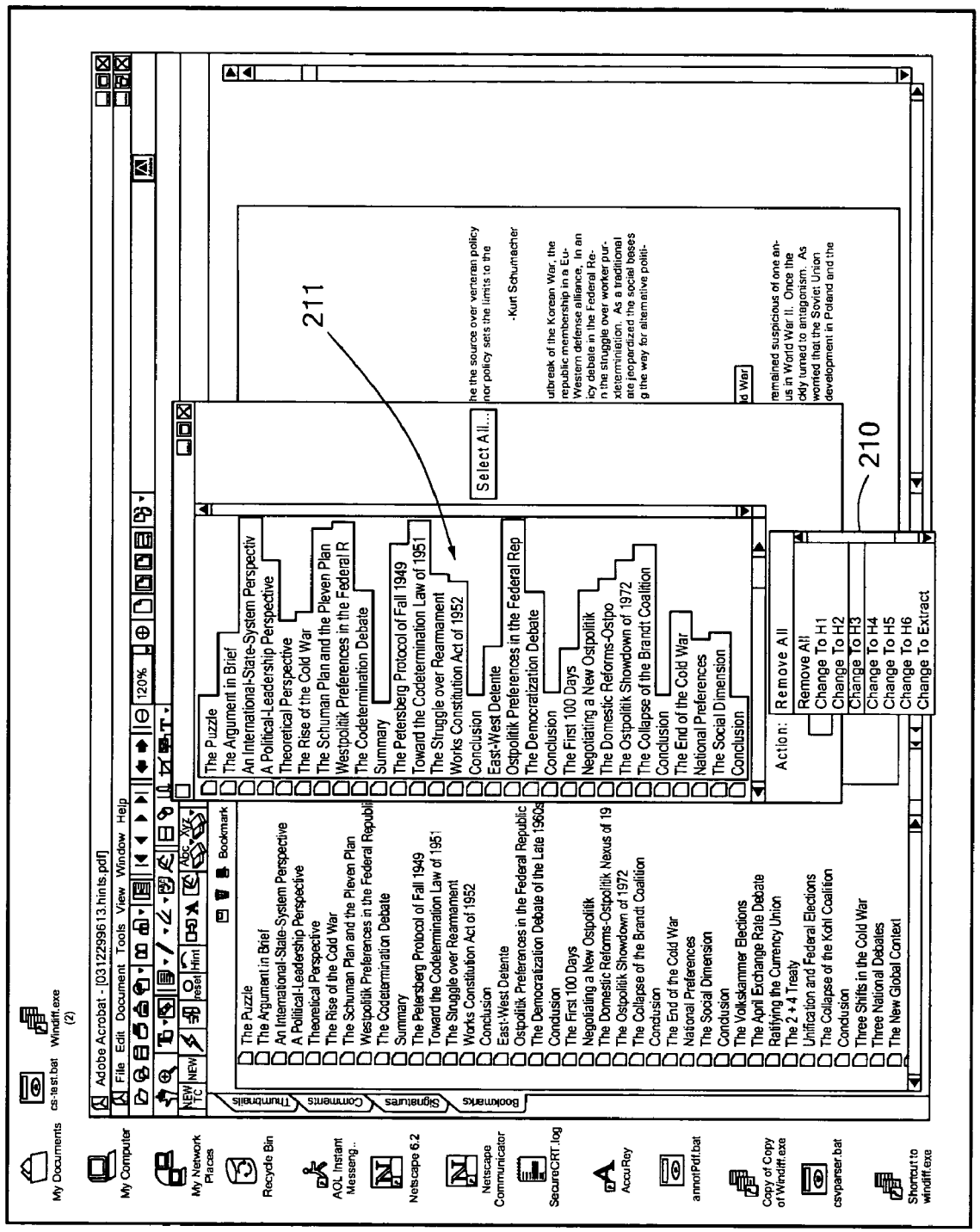
FIG. 6 is a view of an exemplary screen display showing an operator changing the H2 header level shown in FIG. 5 to an H3 header level in accordance with this invention.
Figure 7:
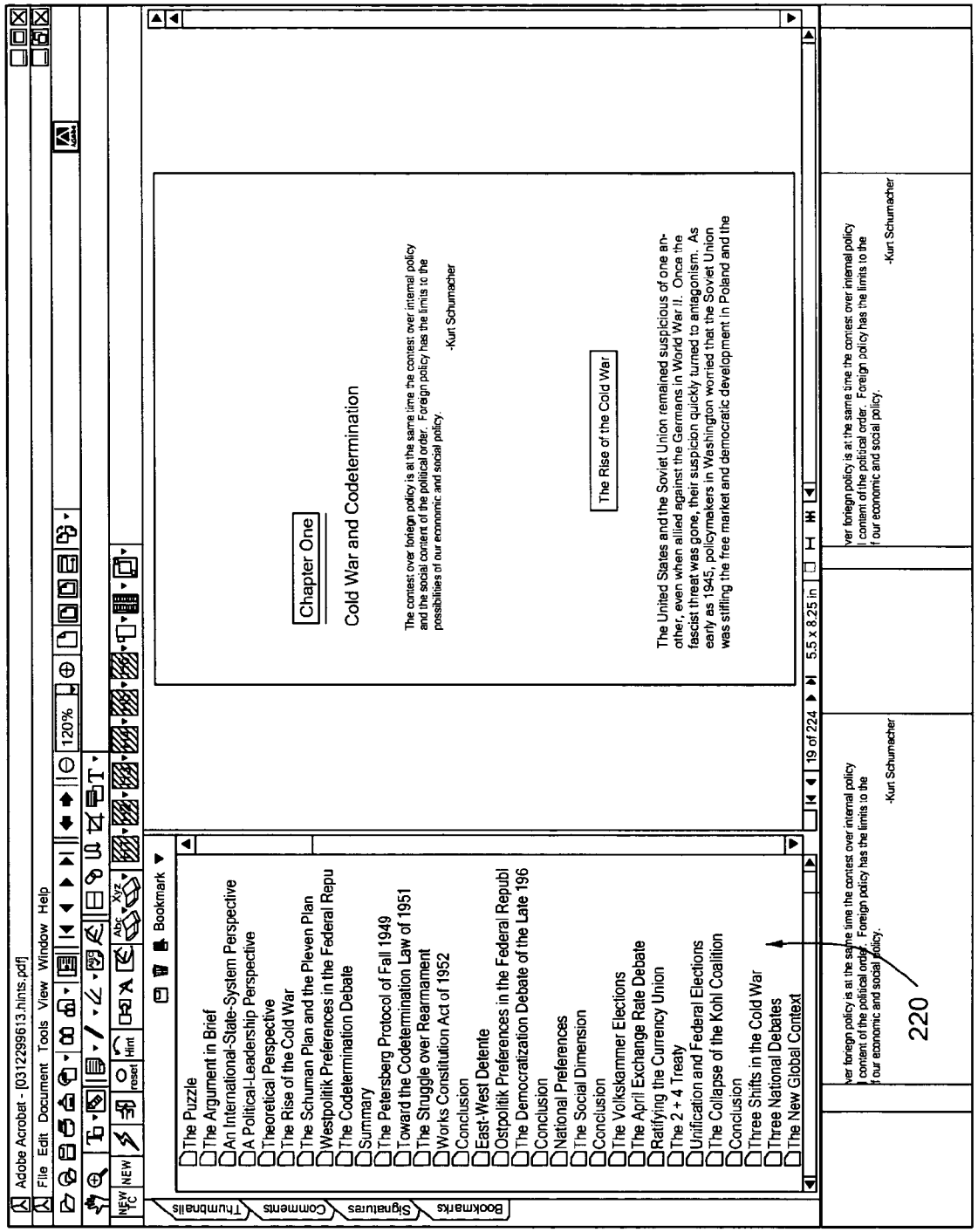
FIG. 7 is a view of an exemplary screen display showing the change to the H3 header level depicted by the H3 header level changing color.

Another example of method 2) is shown in FIGS. 5-7. In this example, an operator has selected all the H2 header levels structural elements of annotated PDF file 31, FIG. 3 by selecting change elements icon 207, FIG. 5 which causes verification engine 30 to activate change window 208 which allows the operator to select the H2 header level. To change all the H2 header levels to H3 header levels, the operator selects "Change to H3" from drop down box 210, FIG. 6 which highlights the selected header levels in color, such as purple. Verification engine 30, FIG. 3 processes the requested change which is processed by conversion engine 22. Conversion engine 22 locates all occurrences of header level H2 in structured file 26 and changes all the H2 header levels to H3 header levels. The resulting change is shown in annotated PDF file 31 by graphic interface 150. In one example, the changed H3 header levels are depicted in color, such as green, as shown by the shaded areas indicated by arrow 220, FIG. 7.

The process of indicating examples (e.g., method 1) or explicit instances of structural elements (e.g., method 2) by the operator (operator input 97, FIG. 3) continues iteratively until all the desired structural mark-up is correct, hence eliminating any errors in the conversion of unstructured file 24 to structured file 26. The result is a highly efficient conversion process which reduces the cost of production and reduces the conversion cycle.

Modified representation 32, may include any and/or all of the file representations (e.g., flat file representation 38, intermediate mark-up language file 40 and XML representation file 42) that were first created by conversion engine 22 and may have been changed due to operator input (e.g., method 1) and 2) above). Verification engine 30 selectively updates those representations which have been changed and is re-run for only the affected formats or parts of formats by conversion engine 22, as shown at 34.

Figure 16:
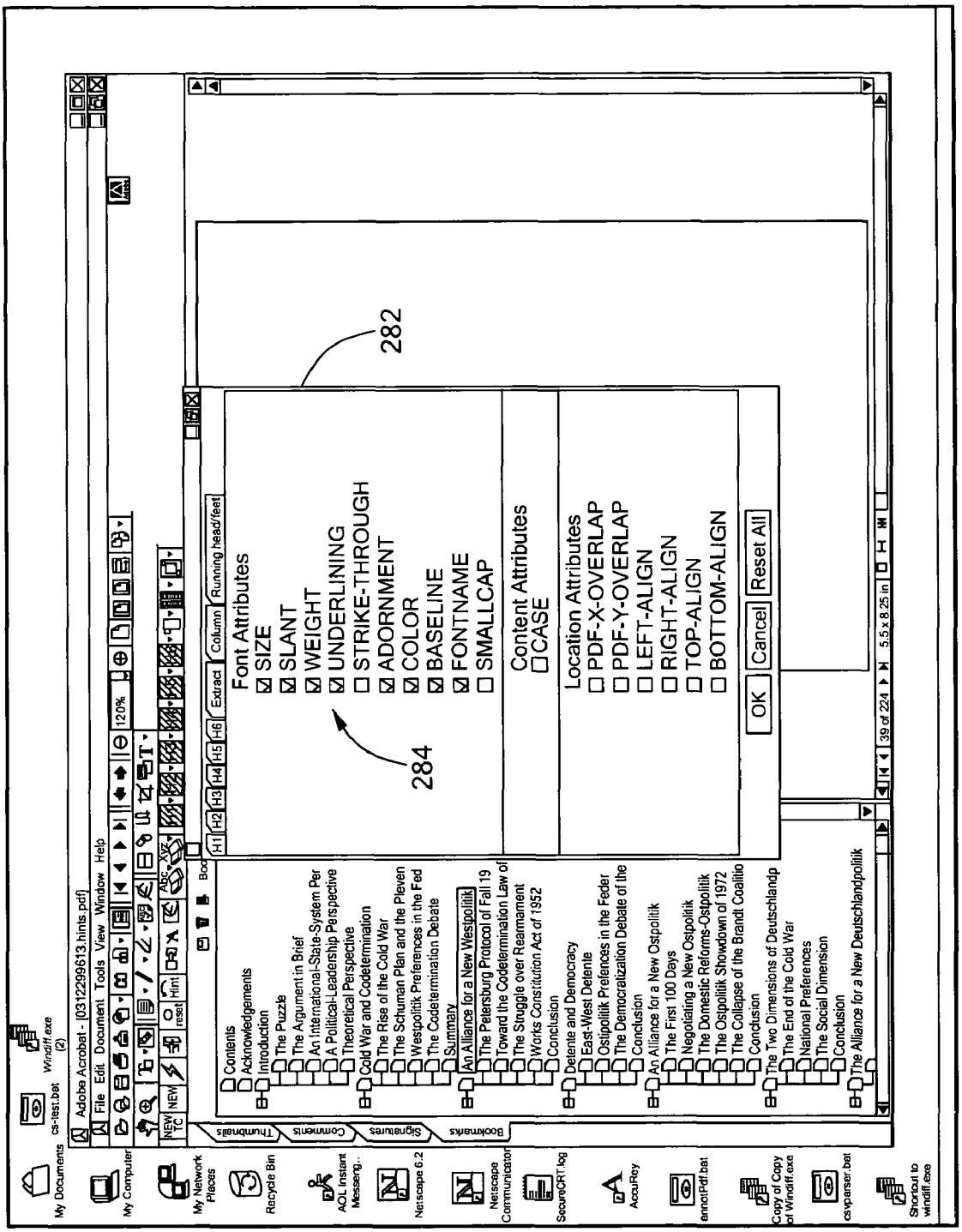
FIG. 16 is a view of an exemplary screen display showing an operator modifying the rules attributes in accordance with this invention.

Verification engine 30 also provides the ability for an operator to modify the verification rules 99 used by verification engine 28 in order to facilitate the hinting process (e.g., method 1) and method 2) above) as shown in FIG. 16. The hinting process may also indirectly affect the set of rules 47 used in rules engine 44, but the operator does not change them directly. The structure added by the operator through verification engine 30 may influence the operation of the rules engine 44 within conversion engine 22.

Once the operator has completed the interactive session with verification engine 30 (e.g., by methods 1 and 2 above) to annotate and reprocess structured document 26, conversion engine 22 perform a final pass, as indicated at 51. The final pass starts from XML representation 42 and incorporates all the information retrieved by verification engine 22 through the verification process and the information acquired by the interative session to create an analysis of the document. This step is essential to reconsider the document and take into account the impact of the iterative verification modifications on the remaining output portions of the document.

Figure 9:
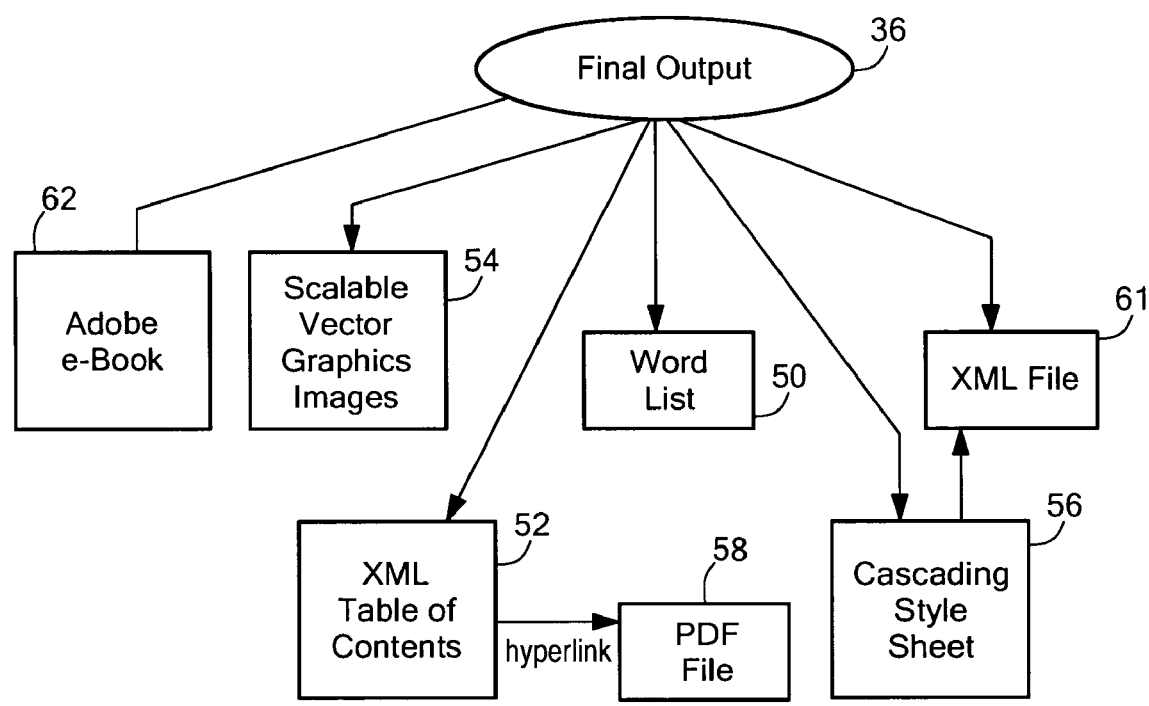
FIG. 9 is a graphical representation showing an example of the types of final output produced by the method and expert system of the subject invention.

The final output by conversion engine 22 of expert conversion method and system 20 may include word list 50, FIG. 9 which typically includes the coordinates of each word on a page, a table of contents 52, scaleable vector graphic images 54, and cascading style sheet 56. Typically, the XML table of contents 52 is hyperlinked to PDF file 58. The output may also include XML file 61 and ADOBE® e-Book 62.

Figure 11:
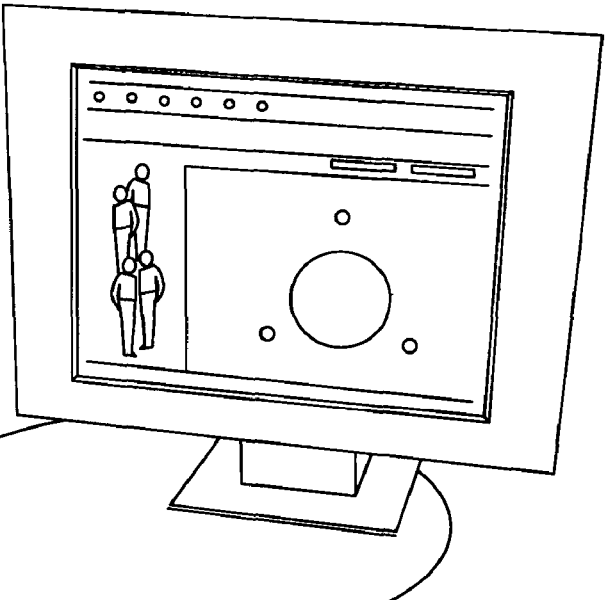
FIG. 11 is a view of a portion of one of the documents selected from the plurality of documents shown in FIG. 10.
Figure 12:
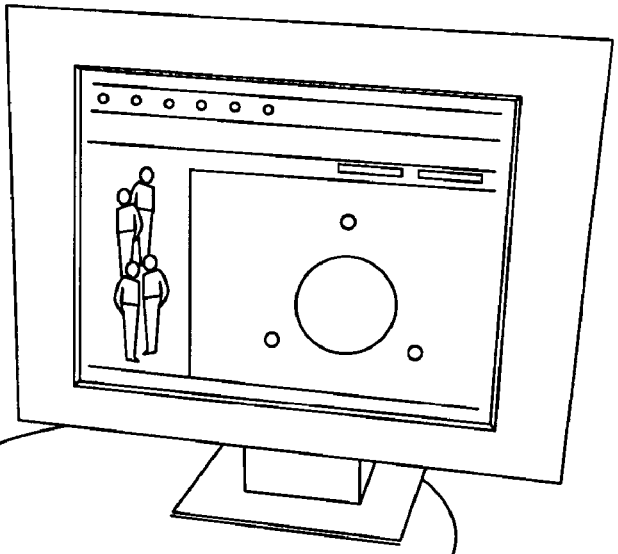
FIG. 12 is a view showing how the document selected in FIG. 11 can be searched and further showing the results of the search conducted in FIG. 11.

FIG. 10 shows a view of exemplary screen display 60 displaying a number of documents 62, 63, 65 converted into XML format in accordance with the system and method of this invention. The result of selecting document 62 is shown in FIG. 11. As shown in FIG. 11, XML format document 62 includes table of contents 64, drop down search for box 67, drop down search in box 69, keyword search box 71, "Find It" icon 73, back icon 75, forward icon 77, zoom drop down box 79, "Go To" box 81, qualify drop down box 83, and visual display area box 85. Exemplary screen display 68, FIG. 12 shows an operator entering a search for the word "fiscal", in search box 71 and the results of the search are indicated at 72.

As discussed above, the structural elements of annotated PDF file 31, FIG. 3 may be modified by an operator to add or suggest classifications to define and classify header level components of annotated PDF file 31 with verification engine 30. In one embodiment, a plurality of header levels of annotated PDF file 31 include H1, H2, H3, H4, H5, and H6. In one example, the H1 header level classifies a "Part" of annotated PDF file 31, as discussed above. In other examples, the H2 header file classifies a "Chapter" of annotated PDF file 31, the H3 header classifies a "Subchapter", and the H4 header level classifies a "Sub-subchapter" of annotated PDF file 31. The H5 and H6 header levels typically are user defined header levels used to classify user defined elements of the annotated PDF file 31. Although as shown above, the various header levels may classify a Part, Chapter, Subchapter, or Sub-subchapter, this is not a necessary limitation of this invention, as any component may be annotated and classified in the annotated PDF file 31, such as title, front matter, index item, list item, and the like. The header levels H1-H6 are examples of components to be classified.

In one example of this invention, the H2 header levels of annotated PDF file 31, FIG. 3 are classified by an operator by selecting H2 icon 106, FIG. 13 and drawing box 108 about the visual depictions which represent the H2 header level, such as the chapter heading "Cold War and Codetermination" indicated at 109, FIG. 13. In this example, H2 icon 100 is colored blue and box 108 is a solid blue box.

Similarly, the H3 header levels are classified by an operator selecting H3 icon 110 and a drawing box (not shown) about the visual depictions (e.g., displayed structural elements) which represent the H3 header level (e.g., a "Subchapter"). The H4 header levels may be classified by an operator selecting H4 icon 112 and a drawing box (not shown) about the visual depictions which represent the H4 header level (e.g., a "Sub-subchapter"). Typically, H3 icon 110 is green and the H4 icon is fuchsia.

In other examples, the H4 and H5 header levels are classified by selecting H4 icon 112 or H5 icon 114 and a drawing box (not shown) about the visual depictions which represent the H4 or H5 header levels (e.g., user defined classification). Typically, H5 icon 114 is aqua and H6 icon 116 is white.

In other examples of this invention, a running footer is classified by selecting icon 120 and drawing a box (not shown) about the visual depictions which represent the running footer of structured file 26 displayed as annotated PDF file 31. In other examples, a running header is defined by selecting icon 120 and similarly drawing a box (not shown) about the annotated visual depictions which represent the running footer.

In a preferred embodiment of this invention, expert conversion method and system 20 includes a plurality of icons which allow an operator to modify the structure of annotated PDF file 31, FIG. 3 by adding classifications and/or suggesting classifications, and/or suggesting rules for the classifications, and/or suggesting hints for the classifications.

Figure 14:
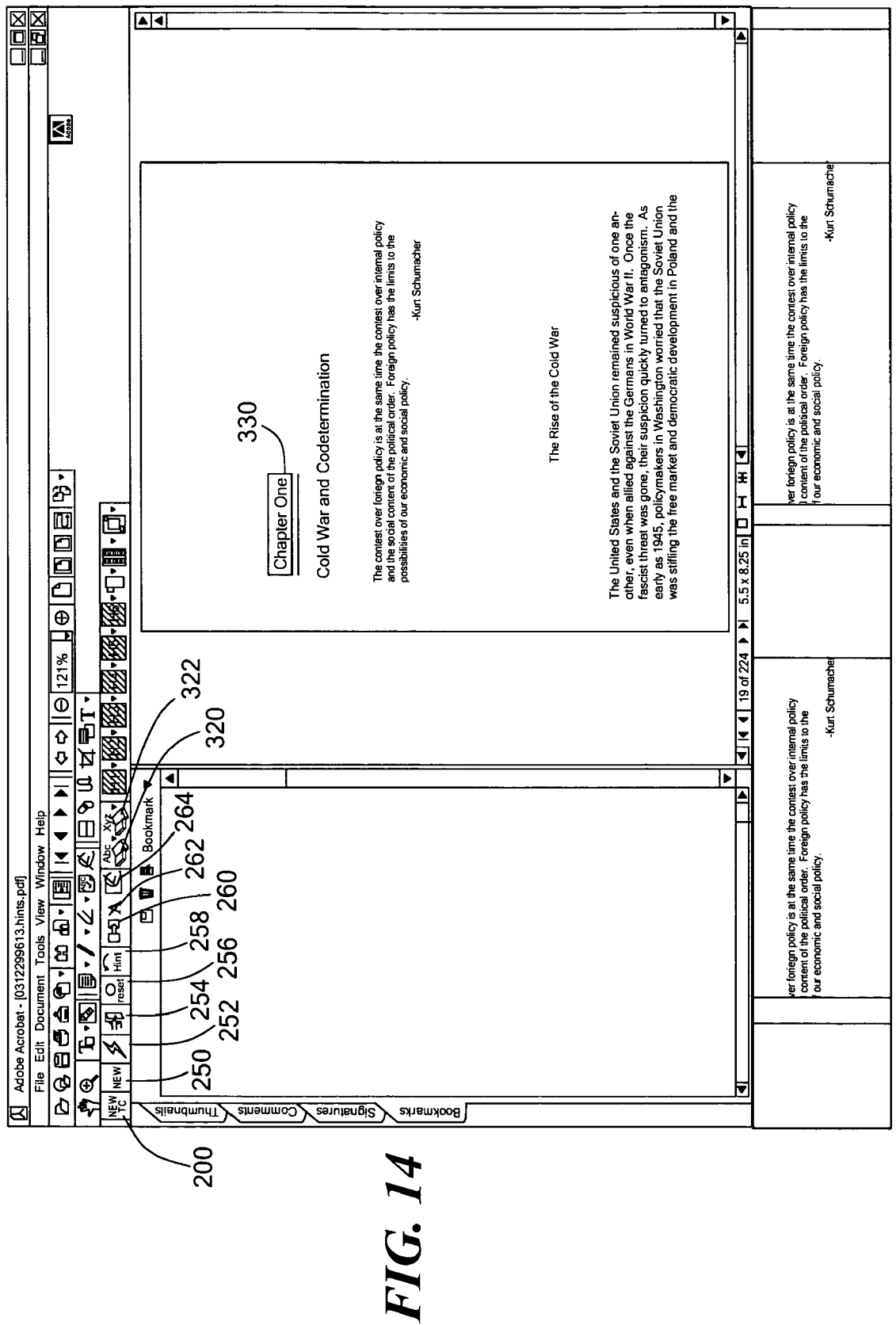
FIG. 14 is a view of an exemplary screen display showing the various icons of the expert conversion system of this invention.

In one embodiment, New TC icon 200, FIG. 14 creates a hint file containing hintable objects found by the first pass of graphics based page description file 28 through conversion engine 22 of expert system 20. Selecting New TC icon 200 initiates system 20, FIG. 3 and conversion engine 20 attempts to locate and classify structure elements in graphics based page description file 28 which are displayed as annotated PDF file 31. However, this first pass is not always 100 percent accurate. For example as shown in FIG. 4, the H2 header levels classified in fact should have been labeled as header H3. A unique feature of expert conversion method and system 20 is that, as discussed above, an operator can easily change the H2 header levels to H3.

Figure 15:
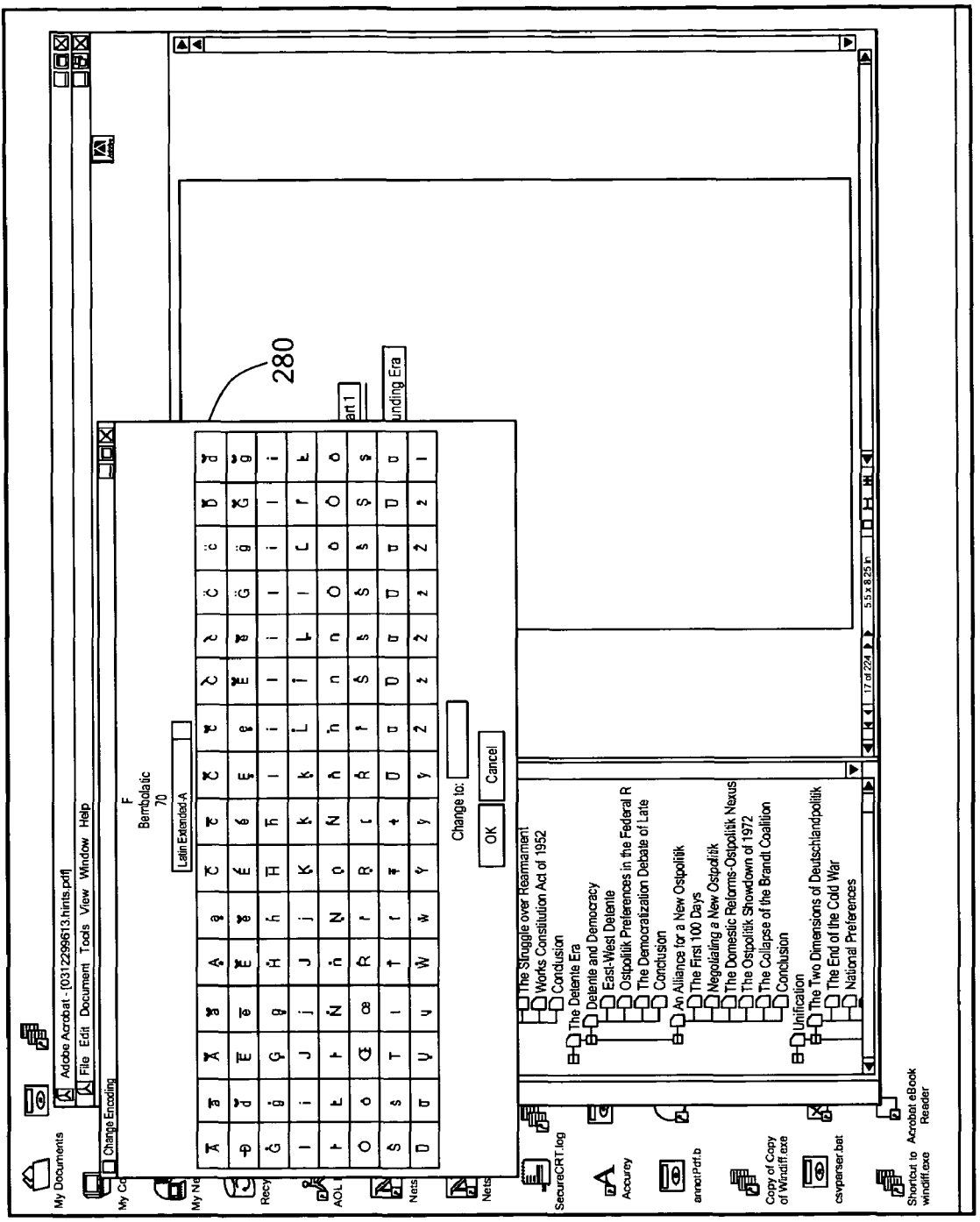
FIG. 15 is a view of an exemplary screen display showing an operator defining the unicode encoding in accordance with this invention.

New icon 250, FIG. 14 creates a blank hint file so an operator can begin the hinting process via verification engine 30 from scratch. Icon 252, in one example depicting a yellow lightning bolt, executes the hinting process (e.g., verification engine 30). Finish icon 254 is selected when the operator has completed all the iterations of hinting process. Selection finish icon 254 copies all the changes made during the hinting/verification process and also creates ADOBE® e-Book 62, FIG. 9. Stop icon 256, typically displayed as a red Stop-sign, clears all local and intermediate files and is used when an operator puts the system 20, FIG. 3 into an unmanageable state. Undo hint icon 258 undoes the result of the last hint cycle and is used when the operator hints something in error. Change element icon 260 as discussed above, typically green and blue boxes, is used to change existing elements into another class of elements. For example, change element icon 260 is selected in order to activate change dialog box 208, FIG. 5 and change dialog box 210, FIG. 6 to change H2 header levels to H3 header levels. Changing coding icon 262, FIG. 14 activates dialog box 280, FIG. 15. Icon 262 is selected when graphics based page description file 28 contain incorrect unicode mapping for graphs, or in some examples, no mapping at all. For example, an "A" should have a unicode value of 65. If it is marked having a different value, or no value at all then an operator will need to use dialog box 280 to correct it. Edit rules icon 264, FIG. 14 activates dialog box 282, FIG. 16. Dialog box 282 is used to configure a match when an operator draws a hint for a particular element. In one design, box size, slant, weight, underline, strikethrough, adornment, color, baseline, font name, small caps, content attributes including case, location attributes, including PDF-x overlap, PDF-y overlap, left align, right align, top align, and bottom align can be selected by entering a check in any of the various checkboxes, indicated by arrow 284, in dialog box 282. When execute icon 252 (represented in this example as a yellow lightning bolt) is activated by an operator expert conversion method and system 20 determines the characteristics of the text in the hint file created from the selections in dialog box 282 and locates all text matching attributes selected in dialog box 282. Body-Start icon 320, FIG. 14 and Body-End icon 322 are used to mark the beginning and end of a body of the document (e.g., annotated PDF file 31). The body of the document is defined as the main text of the document and contains anything after the front matter (copyright page, introduction, and the like) and before the back matter (index, bibliography, and the like). Different rules of set of rules 47, FIG. 3 of rules engine 44 are used for processing the body text and the front or back matter. The operator brings up the first page of the body of annotated PDF file 31 (in this example which would be "Chapter 1", as indicated at 330, FIG. 14 and selects Body-Start icon 320. The operator then flips to the last page of the body and presses the Body-End icon 322. Then, when expert conversion method and system 20 is processed, system 20 uses this information to process the book correctly.

Figure 17:
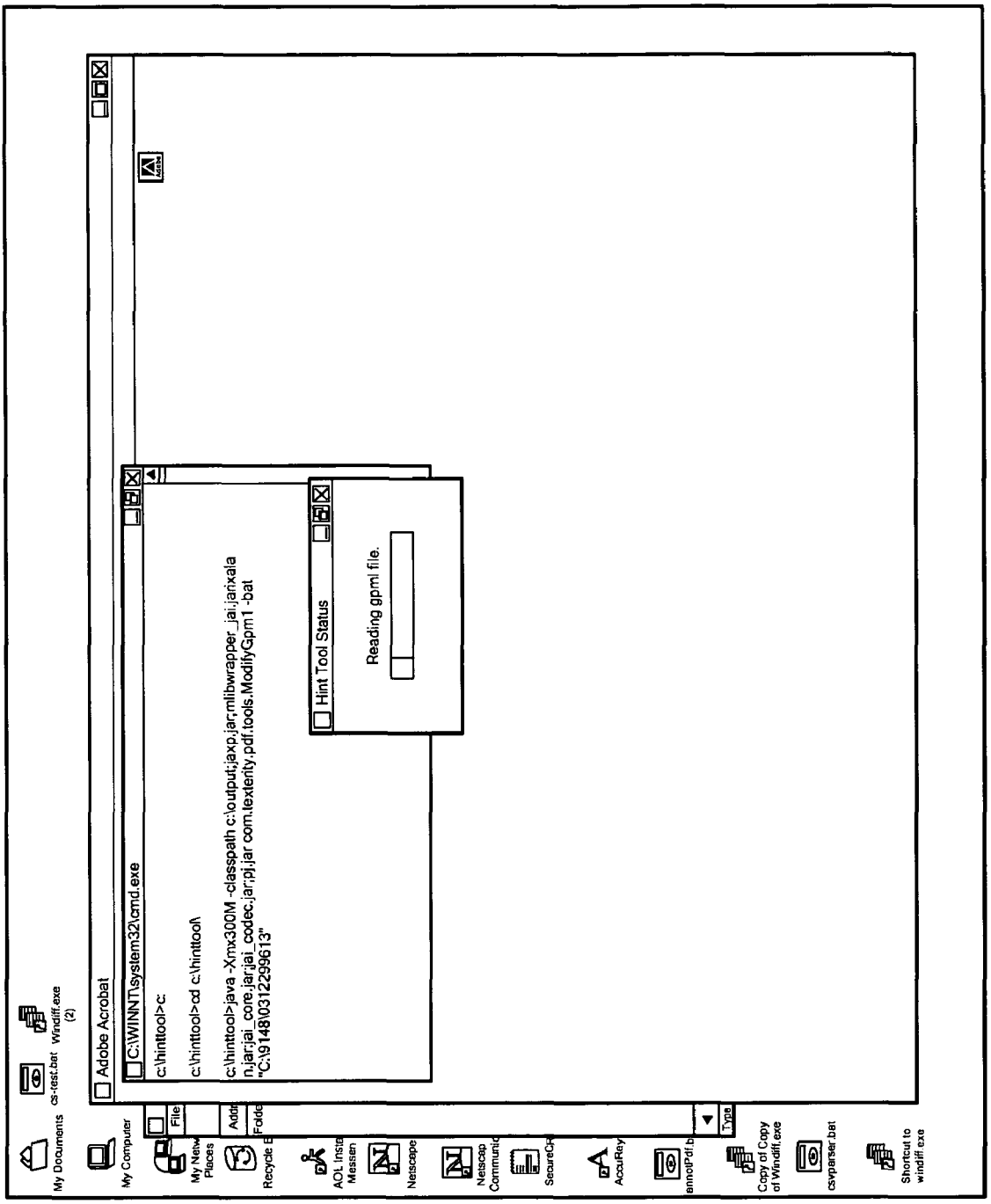
FIG. 17 is a view of an exemplary screen display showing the status of the hinting process.
Figure 18:
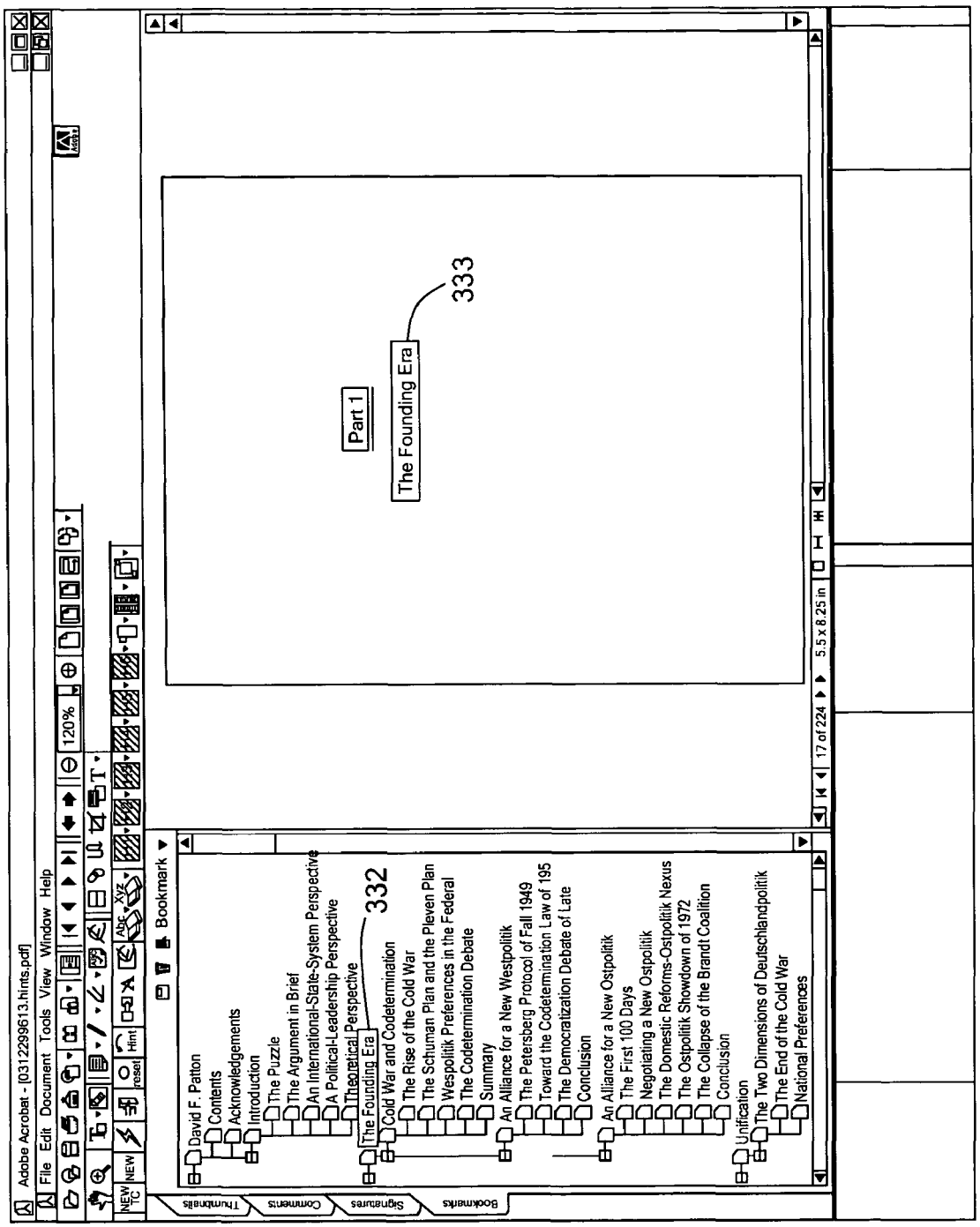
FIG. 18 is a view of an exemplary screen display showing the completion of the hinting process and further showing a bookmark in bold and italicized indicating an error.
Figure 19:
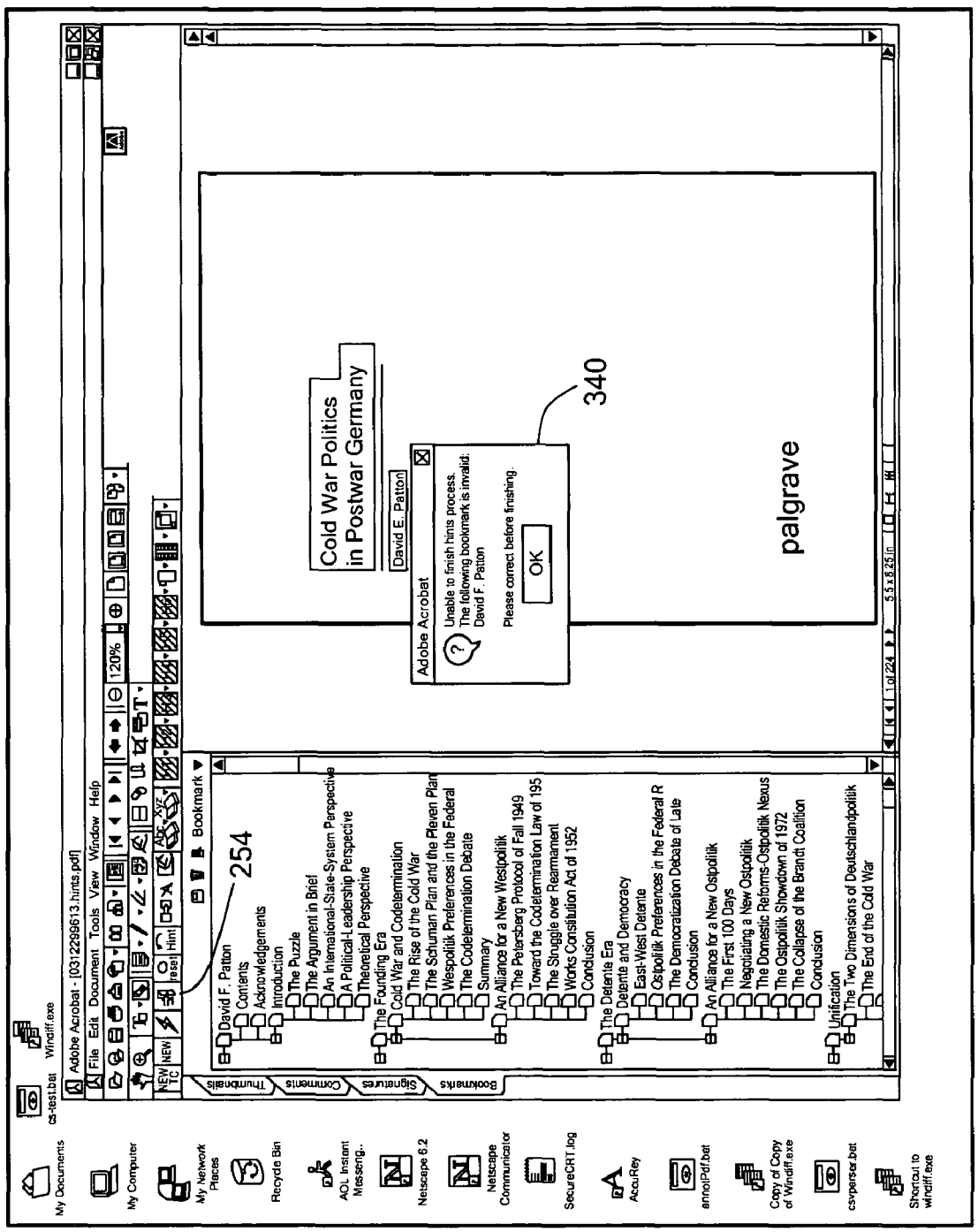
FIG. 19 is a view of an exemplary screen display showing an operator attempting to hit the finish icon and a dialog box showing that the selection is not allowed because the bookmark shown in FIG. 18 has an error.
Figure 20:
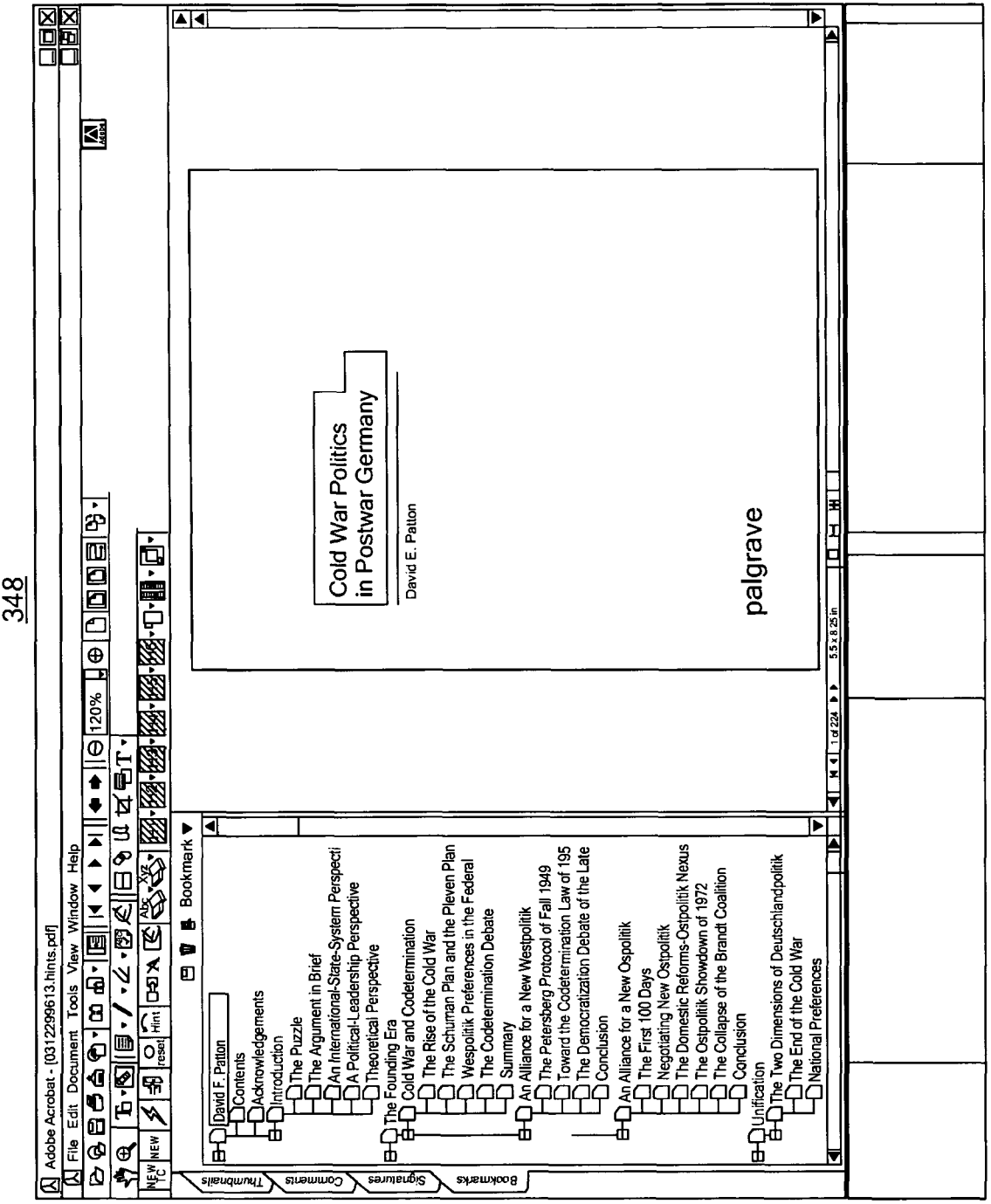
FIG. 20 is a view of an exemplary screen display showing the results of an operator manually deleting the incorrect bookmark in FIG. 18.
Figure 21:
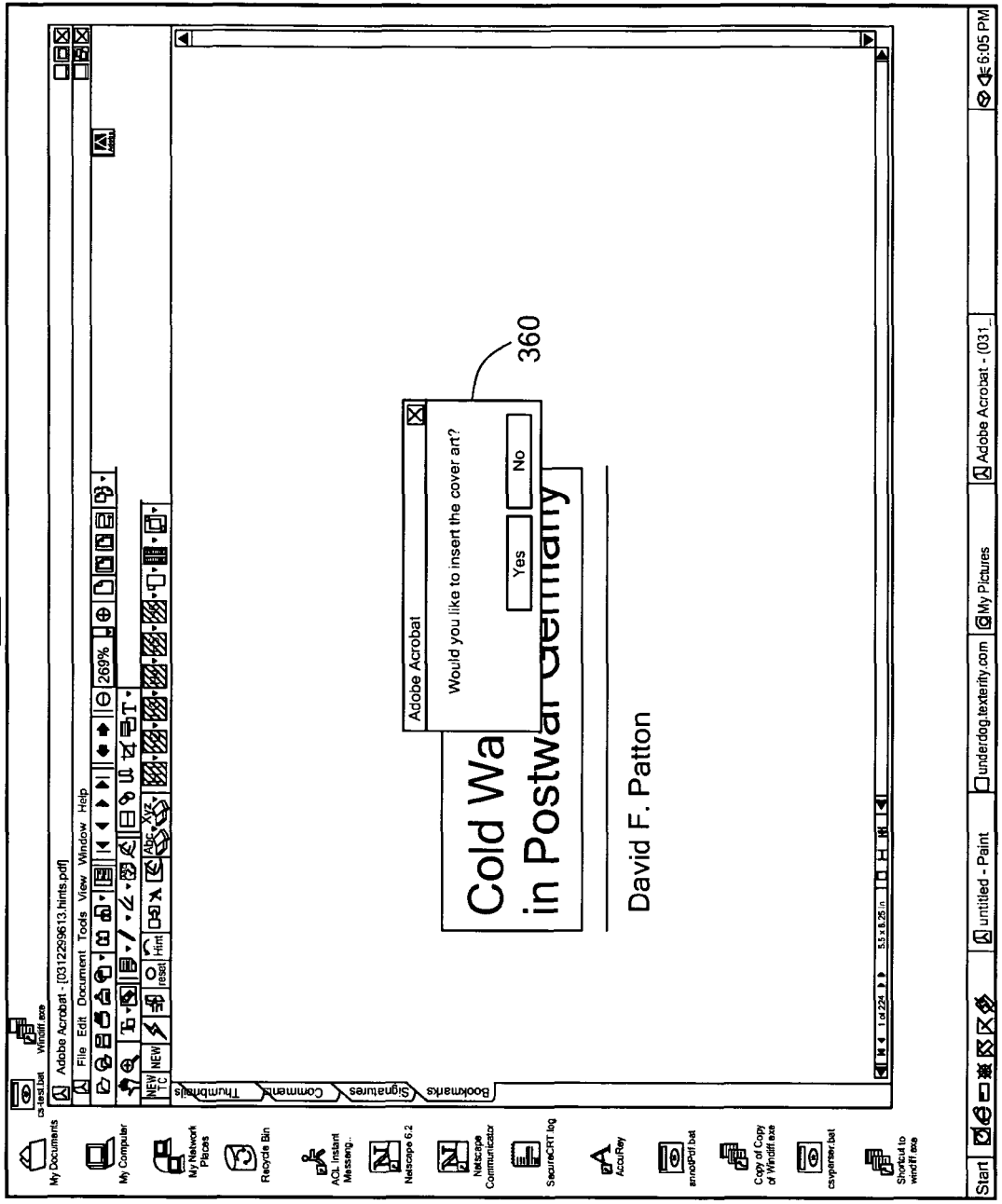
FIG. 21 is a view of an exemplary screen display after an operator has selected the finish icon.

FIG. 17 shows the status of the hinting process executed by system 20 after icon 252 has been selected. FIG. 18 shows the completed process after execute icon 252 has been activated. The dash box (e.g., red dashed box 170, FIG. 8 facilitated as part of the hinting process) is now solid box 330, FIG. 18 typically red in color. The first bookmark is shown bold and italicized, indicated at 333, indicating that the bookmark has an error and requires attention. FIG. 19 shows dialog box 340 after an operator has selected finish icon 254 but this selection is not allowed because the bookmark is still invalid. FIG. 20 shows exemplary screen display 348 after the operator has manually deleted the annotations from the incorrect bookmark. FIG. 21 shows exemplary screen display 358 after finish icon 254 is selected and expert conversion method and system 20 inquires if the operator wants to insert a cover page, as indicated by dialog box 360.

Figure 22:
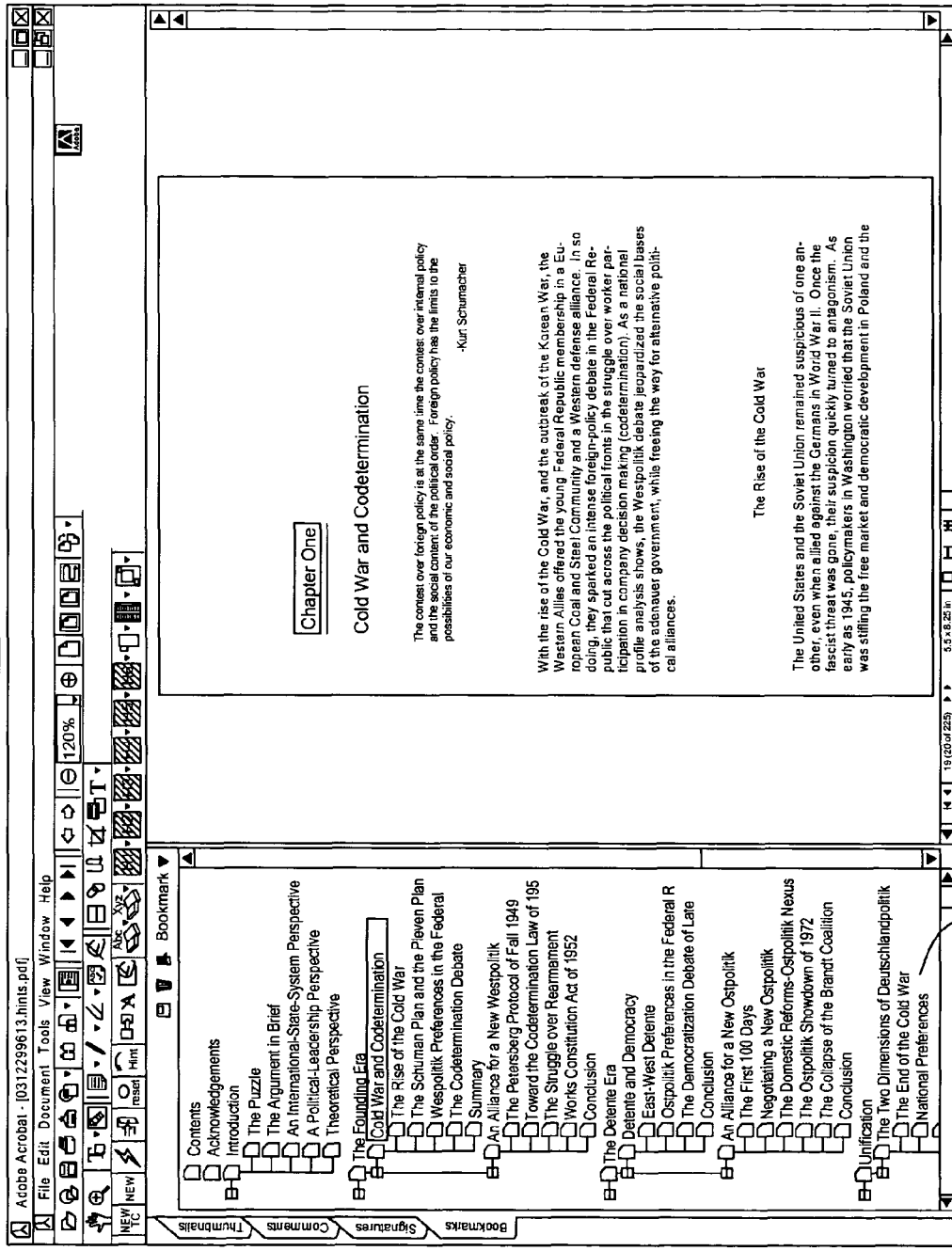
FIG. 22 is a view of an exemplary screen display showing a completed ADOBE® e-Book in accordance with this invention.

FIG. 22 shows a view of exemplary screen display 390 depicting a completed ADOBE® e-Book with bookmarks 400 and no annotations. The colors used for the hinting and indication of header levels are no longer present, a completed ADOBE® e-Book file has been created by system 20.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

What is claimed is:

1. An expert system for more efficiently and accurately deducing document structure from document formatting, the expert system comprising:

a conversion engine for converting an unstructured file to a structured file, the conversion engine configured to locate document formatting including frequency of usage, repetitions and locations of text, spacing of text and style of text in the unstructured file to initially deduce document structure from the document formatting; and a verification engine, responsive to the output of the conversion engine, for generating and displaying a visual representation file of the structured file annotated with visual depictions of the classified components of the structured file on a display device so that the annotations with the visual depictions of the classified components can be modified, classifications of the components can be added and classifications of the components can be suggested by an example, and the structured file reprocessed by the conversion engine which to further deduce the document structure, uses the initially deduced document structure, the annotations that are modified, the classifications that are added, the classifications that are suggested, a rule that is derived from the examples provided via the verification engine and all occurrences in the structured file that match the derived rule, the conversion engine and the verification engine operating iteratively until an operator indicates the structured file annotated with visual depictions is correct.

2. The expert system of claim 1 in which the representation file is a graphics based page description language file annotated with visual depictions of the classified components of a document.

3. The expert system of claim 2 in which, after the annotated graphics based page description language file is modified, it is input to the conversion engine.

4. The expert system of claim 1 in which the conversion engine is programmed to:
 convert a graphics based page description language file to a flat file representation of all metrics known about each character and image of the graphics based page description language file;
 group all said metrics in an intermediate mark-up language file; and
 create an output mark-up language file including components of the document classified into their respective component parts and relationships.

5. The expert system of claim 4 in which the graphics based page description language file is a PDF file, the flat file is a comma separated value file, the intermediate mark-up language file is a GPML file, and the output file is an XML file.

6. The expert system of claim 1 in which the conversion engine includes a rules engine including a set of rules.

7. The expert system of claim 6 further including a feedback channel wherein an annotated graphics based page description language file modified using the verification engine is compared with the original annotated graphics base page description language file and, based on the comparison, the conversion engine is programmed to change the operation of the rules of the rules engine.

8. The expert system of claim 1 in which the conversion engine is programmed to output outputs selected from the following group: a word list including the coordinates of each word on a page, a table of contents, scaleable vector graphic images, a cascading style sheet, and an ADOBE e-Book.

9. The system of claim 1 in which the structured file annotated with visual depictions is modified to classify the annotations as a plurality of header level components of the structured file.

10. The system of claim 9 in which the plurality of header levels include H1, H2, H3, H4, H5, and H6.

11. The system of claim 10 in which the H1 header level classifies a "Part" of the structured file.

12. The system of claim 11 in which the H1 header level is classified by selecting an H1 icon and drawing a box about the annotated visual depictions which represent the "Part" of the structured file.

13. The system of claim 12 in which the H1 icon and the box are colored red and the H1 icon includes the text "H1".

14. The system of claim 10 in which the H2 header level classifies a "Chapter" of the structured file.

15. The system of claim 14 in which the H2 header level is classified by selecting an H2 icon and drawing a box about the annotated visual depictions which represent the "Chapter" of the structured file.

16. The system of claim 15 in which the H2 icon and the box are colored blue and the icon includes the text "H2".

17. The system of claim 10 in which the H3 header level classifies a "Subchapter" of the structured file.

18. The system of claim 17 in which the H3 header level is classified by selecting an H3 icon and drawing a box about the annotated visual depictions which represent the "Subchapter" of the structured file.

19. The system of claim 18 in which the H3 icon and the box are colored green and the icon includes the text "H3".

20. The system of claim 10 in which the H4 header level classifies a "Sub-subchapter" of the structured file.

21. The system of claim 20 in which the H4 header level is classified by selecting an H4 icon and drawing a box about the annotated visual depictions which represent the "Sub-subchapter" of the structured file.

22. The system of claim 21 in which the icon and the box are colored fuchsia and the H4 icon includes the text "H4".

23. The system of claim 10 in which the H5 header level classifies an operator defined element of the structured file.

24. The system of claim 23 in which the H5 header level is classified by selecting an H5 icon and drawing a box about the annotated visual depictions which represent an operator defined part of the structured file.

25. The system of claim 24 in which H5 the icon and the box are colored aqua and the H5 icon includes the text "H5".

26. The system of claim 10 in which the H6 header level classifies an operator defined element of the structured file.

27. The system of claim 26 in which the H6 header level is classified by selecting an H6 icon and drawing a box about the annotated visual depictions which represent an operator defined element of the structured file.

28. The system of claim 27 in which the H6 icon and the box are colored white and the icon includes the text "H6".

29. The system of claim 1 in which the structured file annotated visual with depictions is modified to add or suggest classification of running header components at the top of every page of the structured file.

30. The system of claim 29 in which the running header is classified by selecting a header/footer icon and drawing a box about the annotated visual depictions which represent the running header of the structured file.

31. The system of claim 30 in which the header/footer icon and the box are colored orange and the icon includes the depiction of page with a header and footer.

32. The system of claim 1 in which the structured file annotated visual with depictions is modified to add or suggest classification of running footer components at the bottom of every page of the structured file.

33. The system of claim 32 in which the running footer is classified by selecting a header/footer icon and drawing a box about annotated visual depictions which represent the running header of the structured file.

34. The system of claim 1 further including a plurality of icons for activating the conversion engine and verification engine.

35. The system of claim 34 further including a "New" icon to initialize and create a hint file so that an operator can define hints.

36. The system of claim 34 further including an "Execute" icon to execute a hinting process.

37. The system of claim 34 further including a "New TC" icon to create a hint file containing hintable objects file.

38. The system of claim 34 further including a "Reset" icon to clear all local and intermediate files of the system.

39. The system of claim 34 further including an "Undo Hints" icon to undo the results of a last hint cycle.

40. The system of claim 34 further including a "Change Elements" icon to change existing elements of the structured annotated graphics based page description file from one class of elements to another class of elements.

41. The system of claim 34 further including a "Change Encoding" icon to activate a dialog box wherein an operator can correct unicode mapping of the structured annotated graphics based page description file.

42. The system of claim 34 further including an "Edit Rules File" icon to activate a dialog box for an operator to configure a match for a particular hint element.

43. The system of claim 34 in which the dialog box is provided to select particular attributes of the structured annotated graphics based page description file.

44. The system of claim 43 in which the dialog box selects size, slant, weight, underline, strikethrough, adornment, color, baseline, font name, small caps, case, PDF-x-overlap, PDF-y-overlap, left-align, right-align, top-align, and bottom-align.

45. The system of claim 34 further including a "Body-Start" icon to mark the beginning of a text body of the structured annotated graphics based page description file.

46. The system of claim 34 further including a "Body-End" icon to mark the end of a body of the structured annotated graphics based page description file.

47. A method for more efficiently and accurately deducing document structure from document formatting, the method comprising:
  a) converting an unstructured file to a structured file wherein the components of the structured file are classified, the step of converting including locating document formatting that include frequency of usage, repetitions and locations of text, spacing of text and style of text in the unstructured file to initially deduce document structure from the document formatting;
  b) generating and displaying a visual representation file of the structured file annotated with visual depictions of the classified components thereof;
  c) at least one of the steps of modifying the annotated visual depictions, adding classifications of the components, and suggesting classifications of the components by an example associated with step a); and
  d) repeating steps a), b), and c) until no further modifications, additions or suggestions are made, step a) further including deducing the document structure by using the initially deduced document structure, the annotated visual depictions that are modified, the classifications that are added, the classifications that are suggested, a rule that is derived from the example, and all occurrences that match the derived rule.

48. The method of claim 47 further including the step of creating an output file based on the structured file and the modifications and/or additions and/or suggestions made in steps c) and d).

49. The method of claim 47 in which the displayed representation is a graphics based page description language file annotated with visual depictions of the classified components of the document and in which step c) includes modifying the annotated graphics based page description language file.

50. The method of claim 47 in which step a) includes:
  a1) converting a graphics based page description language file to a flat file representation of all metrics known about each character and image of the graphics based page description language file;
  a2) grouping all said metrics in an intermediate mark-up language file; and
  a3) creating an output mark-up language file including components of the document classified in to their respective component parts and relationships.

51. The method of claim 50 in which step d) includes repeating steps a2) and a3).

52. The method of claim 50 in which step d) further includes repeating step a1), a2) and a3).

53. The method of claim 50 in which the graphics based description language file is a PDF file, the flat file is a comma separated value file, the intermediate mark-up language file is a GPML file, and the output file is an XML file.

54. The method of claim 47 in which step a) includes the operation of a rules engine including a set of rules.

55. The method of claim 54 further including the step of comparing the annotations displayed with the modified annotations, and, based on the comparison, amending the operation of the rules of the rules engine.

56. The method of claim 47 further including the step of outputting, based on the structured file, outputs selected from the following group: a word list including the coordinates of each word on a page, a table of contents, scaleable vector graphic images, a cascading style sheet, and an ADOBE e-Book in PDF format.

* * * * *